US006725343B2

(12) United States Patent
Barroso et al.

(10) Patent No.: US 6,725,343 B2
(45) Date of Patent: Apr. 20, 2004

(54) SYSTEM AND METHOD FOR GENERATING CACHE COHERENCE DIRECTORY ENTRIES AND ERROR CORRECTION CODES IN A MULTIPROCESSOR SYSTEM

(75) Inventors: Luiz A. Barroso, Mountain View, CA (US); Kourosh Gharachorloo, Menlo Park, CA (US); Andreas Nowatzyk, San Jose, CA (US)

(73) Assignee: Hewlett-Packard Development Company, L.P., Housotn, TX (US)

( * ) Notice: Subject to any disclaimer, the term of this patent is extended or adjusted under 35 U.S.C. 154(b) by 341 days.

(21) Appl. No.: 09/972,477

(22) Filed: Oct. 5, 2001

(65) Prior Publication Data

US 2002/0124143 A1 Sep. 5, 2002

Related U.S. Application Data

(60) Provisional application No. 60/238,330, filed on Oct. 5, 2000.

(51) Int. Cl.$^7$ ................................................ G06F 12/08

(52) U.S. Cl. ...................................... 711/145; 711/141

(58) Field of Search ........................... 711/118, 119, 711/141, 144, 148, 145

(56) References Cited

U.S. PATENT DOCUMENTS

| 6,622,218 B2 | * | 9/2003 | Gharachorloo et al. | ..... 711/141 |
| 6,640,287 B2 | * | 10/2003 | Gharachorloo et al. | ..... 711/141 |
| 6,662,333 B1 | * | 12/2003 | Zhang et al. | ............... 714/767 |

OTHER PUBLICATIONS

Agarwal et al. "An Evaluation of Directory Schemes For Cache Coherence," In ACM Annual International Symposium on Computer Architecture, May 1988, pp 280–289.

Bannon, P. "Alpha 21364: A Scalable Single–Chip SMP," "Presented at the Microprocessor Forum, Oct., 1998, pp 1–11.

Barroso et al. "Piranha: A Scalable Architecture Based On Single–Chip Multiprocessing," In Proceedings of the 25$^{th}$ Annual International Symposium On Computer Architecture, Vancouver Canada, Jun. 2000, pp 282–293.

Barroso et al., "Impact Of Chip–Level Integration On Performance of OLTP Workloads," In the 6$^{th}$ International Symposium On High Performance Computer Architecture, Jan. 2000, pp 3–14.

Gupta et al., "Reducing Memory and Traffic Requirements for Scalable Directory Besed Cache Coherence Schemes" In International Conference On Parallel Processing, Jul. 1990, pp I–312–I–321.

Laudon et al., "The SGI Origin: A ccNUMA Highly Scalable Server," In ACM Annual International Symposium On Computer Architecture, Jun. 1997, pp 241–251.

(List continued on next page.)

Primary Examiner—Kevin L. Ellis

(57) ABSTRACT

Each node of a multiprocessor computer system includes a main memory, a cache memory system and logic. The main memory stores memory lines of data. A directory entry for each memory line indicates whether a copy of the corresponding memory line is stored in the cache memory system in another node. The cache memory system stores copies of memory lines and cache state information indicating whether the cached copy of each memory line is an exclusive copy. The logic of each respective node is configured to respond to a transaction request for a particular memory line and its corresponding directory entry, where the respective node is the home node of the particular memory. When the cache memory system of the home node stores an exclusive copy of the particular memory line, the logic responds to the request by sending the copy of the particular memory line retrieved from the cache memory system and a predefined null directory entry value, and thus does not retrieve the memory line and its directory entry from the main memory of the home node.

52 Claims, 11 Drawing Sheets

OTHER PUBLICATIONS

Nowatzyk et al., *"The S3.mp Scalable Shared Memory Multiprocessor,"* In International Conference On Parallel Processing (ICPP'95) Jul. 1995, pp I.1–I.10.

Saulsbury et al., *"Missing the Memory Wall: The Case For Processor/Memory Integration,"* In 23$^{rd}$ Annual Symposium On Computer Architecture, May 1996 pp 90–101.

* cited by examiner

Data Structure for a 64B Memory Line

Node to Bit and Bit to Node AssignmentTable
(for sharer information field 188, coarse vector format)
189

|   | 0 | 1 | 2 | 3 | 4 | 5 | ... | ... | 35 | 36 | 37 | 38 | 39 |
|---|---|---|---|---|---|---|-----|-----|----|----|----|----|----|
| 0 | [0] | 1 | 2 | 3 | 4 | ... | | ... | 34 | 35 | 36 | 37 | 38 | 39 |
| 1 | 40 | 41 | 42 | 43 | ... | | | ... | 73 | 74 | 75 | 76 | | |

L1 Cache (Direct Mapped) 260

For Direct Mapped L1 Cache:
Address Bit Groups = ABCD
Line Address = ABC
Tag = A
Cache Index for Line = BC
State = invalid, shared, clean_exclusive, dirty_exclusive L1 Cache (2 Way Set Associative) 270

For 2-way Set Associative Cache:
Address Bit Groups = ABCD
Line Address = ABC
Tag = AB
Cache Index for Line = C

SYSTEM AND METHOD FOR GENERATING CACHE COHERENCE DIRECTORY ENTRIES AND ERROR CORRECTION CODES IN A MULTIPROCESSOR SYSTEM

This application claims priority on U.S. provisional patent application 60/238,330, filed Oct. 5, 2000, which is hereby incorporated by reference in its entirety.

The present invention relates generally to cache coherence logic for a multiprocessor computer system, and particularly to circuitry and methodologies for generating directory entries and error correction codes for the memory lines stored in the memories of a cache coherent multiprocessor system.

RELATED APPLICATIONS

This application is related to the following U.S. patent applications, all of which are hereby incorporated by reference:

Cache Coherence Protocol Engine and Method for Processing Memory Transaction in Distinct Address Subsets During Interleaved Time Periods in a Multiprocessor System, Ser. No. 09/878,983, filed Jun. 11, 2001, attorney docket number 9772-0322-999;

Scalable Multiprocessor System And Cache Coherence Method, Ser. No. 09/878,982, filed Jun. 11, 2001, attorney docket number 9772-0326-999;

System and Method for Daisy Chaining Cache Invalidation Requests in a Shared-memory Multiprocessor System, Ser. No. 09/878,985, filed Jun. 11, 2001, attorney docket number 9772-0329-999; and Multiprocessor Cache Coherence System and Method in Which Processor Nodes and Input/Output Nodes Are Equal Participants, Ser. No. 09/878,984, filed Jun. 11, 2001, attorney docket number 9772-0324-999.

BACKGROUND OF THE INVENTION

High-end microprocessor designs have become increasingly more complex during the past decade, with designers continuously pushing the limits of instruction-level parallelism and speculative out-of-order execution. While this trend has led to significant performance gains on target applications such as the SPEC benchmark, continuing along this path is becoming less viable due to substantial increases in development team sizes and design times. Such designs are especially ill suited for important commercial applications, such as on-line transaction processing (OLTP), which suffer from large memory stall times and exhibit little instruction-level parallelism. Given that commercial applications constitute by far the most important market for high-performance servers, the above trends emphasize the need to consider alternative processor designs that specifically target such workloads. Furthermore, more complex designs are yielding diminishing returns in performance even for applications such as SPEC.

Commercial workloads such as databases and Web applications have surpassed technical workloads to become the largest and fastest-growing market segment for high-performance servers. Commercial workloads, such as on-line transaction processing (OLTP), exhibit radically different computer resource usage and behavior than technical workloads. First, commercial workloads often lead to inefficient executions dominated by a large memory stall component. This behavior arises from large instruction and data footprints and high communication miss rates that are characteristic for such workloads. Second, multiple instruction issue and out-of-order execution provide only small gains for workloads such as OLTP due to the data-dependent nature of the computation and the lack of instruction-level parallelism. Third, commercial workloads do not have any use for the high-performance floating-point and multimedia functionality that is implemented in modern microprocessors. Therefore, it is not uncommon for a high-end microprocessor to stall most of the time while executing commercial workloads, which leads to a severe under-utilization of its parallel functional units and high-bandwidth memory system. Overall, the above trends further question the wisdom of pushing for more complex processor designs with wider issue and more speculative execution, especially if the server market is the target.

Fortunately, increasing chip densities and transistor counts provide architects with several alternatives for better tackling design complexities in general, and the needs of commercial workloads in particular. For example, the Alpha 21364 aggressively exploits semiconductor technology trends by including a scaled 1GHz 21264 core, two levels of caches, memory controller, coherence hardware, and network router all on a single die. The tight coupling of these modules enables a more efficient and lower latency memory hierarchy that can substantially improve the performance of commercial workloads. Furthermore, integrated designs such as the Alpha 21364 provide glueless scalable multiprocessing, whereby a large server can be built in a modular fashion using only processor and memory chips.

The integration of the coherence hardware and memory controllers on the same chip leads to interesting design choices for how and where to store directory information. One extremely attractive option is to support directory data with virtually no memory space overhead by computing memory error correction codes (ECC's) at a coarser granularity and utilizing the unused bits for storing the directory information.

Given the trend towards larger main memories, dedicated directory storage can become a significant cost factor. Similarly, providing a dedicated datapath for a separate external directory memory reduces the number of pins available for supporting memory and interconnect bandwidth. Therefore, it would be desirable to avoid or reduce the costs, interconnect and latency problems associated with large main memories and their directory storage.

SUMMARY OF THE INVENTION

In a multiprocessor computer system, each respective node includes a main memory, a cache memory system and logic. The main memory stores data in a plurality of memory lines with a directory entry for each memory line. The directory entry indicates whether a copy of the corresponding memory line is stored in the cache memory system in another node. The cache memory system stores copies of memory lines from the main memories of the various nodes, and furthermore stores cache state information indicating whether the cached copy of each memory line is an exclusive copy of the memory line.

The logic of each respective node is configured to respond to a transaction request for a particular memory line and its associated directory entry, where the respective node is the home node of the particular memory. When the cache memory system of the home node stores a copy of the particular memory line and the cache state information indicates that the copy of the particular memory line is an exclusive copy, the logic responds to the request by sending the copy of the particular memory line retrieved from the cache memory system and a predefined null directory entry value, and thus does not retrieve the memory line and its directory entry from the main memory of the home node.

In another aspect of the present invention, the logic of each respective node is further configured to respond to the transaction request, when the cache memory system of the respective node does not store an exclusive copy of the particular memory line, by retrieving the particular memory line and the associated directory entry from the main memory of the respective node and sending the retrieved particular memory line and associated directory entry.

Yet another aspect of the present invention relates to an efficient ECC-based directory implementation for use in a scalable multiprocessor computer system. A combined ECC is used to detect and correct errors in both the data and directory entry of each memory line. The use of a combined data and directory ECC reduces the number of ECC bits needed for each memory line, which in turn permits a larger number of bits to be use for directory storage than if separate ECC's were maintained for the data and the directory entry of each memory line. New logic and methods are used to eliminate or reduce potential problems associated with using a combined ECC for the data and directory.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

All specific quantities (such as numbers of processors, number of nodes, memory sizes, bit sizes of data structures, operating speeds of components, number of interfaces, number of memory locations in buffers, numbers of cache lines, and number of sub-blocks in a memory line), as well as the sizes and number of components in various data structures, disclosed in this document, are provided solely for purposes of explaining the operation of one particular embodiment. These quantities will typically vary, sometimes significantly, from one implementation of the invention to another.

The following is a list of abbreviations frequently used in the descriptions below:

CCP: cache coherence protocol;

CWF: critical-word-first ordering;

ECC: error correction code;

FSM: finite state machine;

HPE: home protocol engine;

ICS: intra-chip switch;

I/O: input/output;

MC: memory controller;

PC: processor core;

RPE: remote protocol engine; and

TSRF: Transient State Register File.

Figure 1:
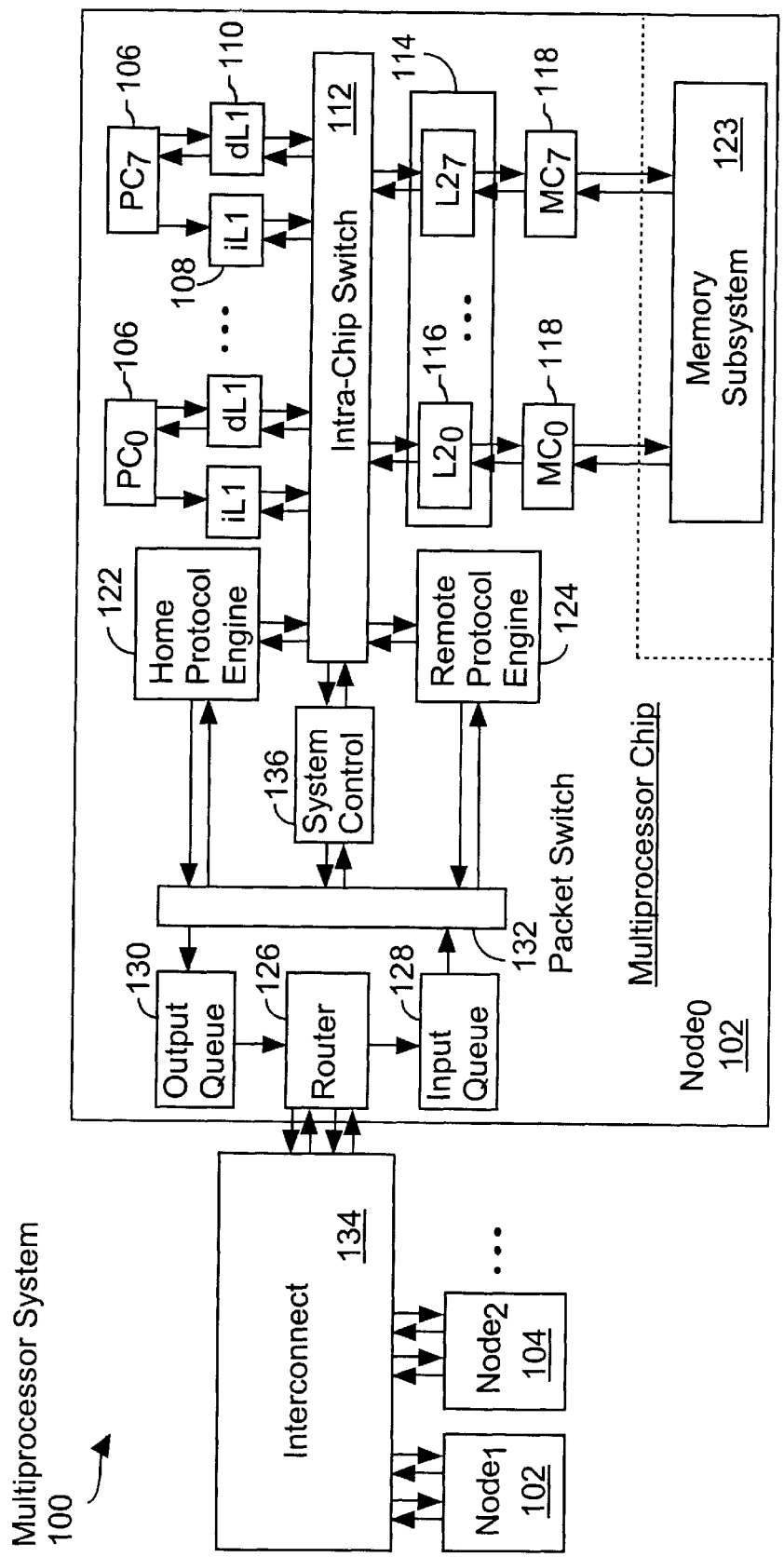
FIG. 1 is a block diagram of a multiprocessor system.

Referring to FIG. 1, there is shown a multiprocessor system 100 including a multiplicity of processor nodes 102 and an I/O nodes 104. Each processor node 102 is preferably implemented as a single chip multiprocessor. In a preferred embodiment, each processor node 102 has eight processor cores (PC) 106; however, other embodiments have two to sixteen PC's 106. The PC's 106, which may be comprised of a central processing unit, are processor cores since their caches, cache coherence logic and other supporting circuitry are shown separately.

Each processor core (PC) 106 is directly connected to dedicated instruction cache (iL1) 108 and data cache (dL1) 110 modules. These first-level caches (L1 cache modules) 108, 110 interface to other modules through an intra-chip switch (ICS) 112. Also connected to the ICS 112 is a logically shared second level cache (L2) 114 that is interleaved into eight separate modules 116, each with its own controller, on-chip tag, and data storage. Coupled to each L2 cache 116 is a memory controller (MC) 118 that preferably interfaces directly to a memory bank of DRAM (dynamic random access memory) chips (not shown) in a memory subsystem 123. In a preferred embodiment, each memory bank provides a bandwidth of 1.6 GB/sec, leading to an aggregate bandwidth of 12.8 GB/sec. Also connected to the ICS 112 are two protocol engines, the Home Protocol Engine (HPE) 122 and the Remote Protocol Engine (RPE) 124, which support shared memory across multiple nodes 102, 104 of the system. Multiple nodes are linked by a subsystem including a router (RT) 126, an input queue (IQ) 128, an output queue (OQ) 130, a packet switch (PS) 132, and a packet switched interconnect 134. The router 136 sends and receives packets to and from other nodes via the interconnect 134. The interconnect 134 physically links multiple nodes 102, 104. In a preferred embodiment the total interconnect bandwidth (in/out) for each node is 32 GB/sec. Finally, a system control (SC) module 136 takes care of miscellaneous maintenance-related functions (e.g., system configuration, initialization, interrupt distribution, exception handling, performance monitoring).

In a preferred embodiment, the various modules communicate exclusively through the connections shown in FIG. 1, which also represent the actual signal connections. This modular approach leads to a strict hierarchical decomposition of the single chip used to implement each node of the system, which allows for the development of each module in relative isolation along with well defined transactional interfaces and clock domains. While each processor node 102 uses a complete multiprocessor system on a chip, the processor nodes 102 do not have any I/O capability in this embodiment.

Figure 2:
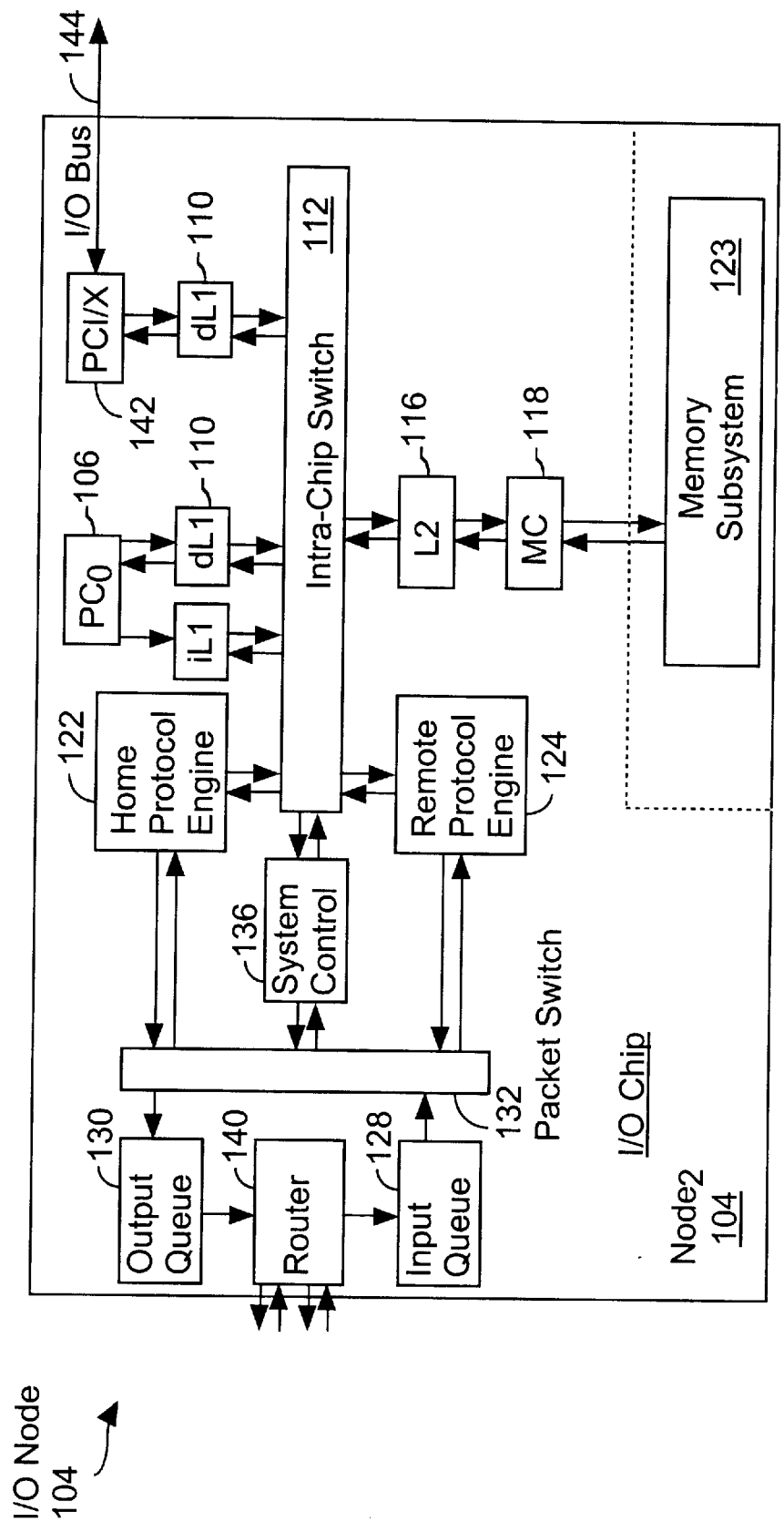
FIG. 2 is a block diagram of an input (I/O) node of the multiprocessor system of FIG. 1.

Instead, I/O is performed by I/O nodes 104, one of which is shown in FIG. 2. Each I/O node 104 is preferably implemented as a single chip that is relatively small in area compared to the chip used to implement the processor nodes 102. Each I/O node 104 is a stripped-down version of the processor node 102 having only one PC 106, one L2 cache 116 and one memory controller module 118. The router 140 on the I/O node 104 is a simplified version of router 126 having support for only two links instead of four, thus eliminating the need for a routing table. The I/O node 104 includes an I/O interface 142, called the PCI/X interface in a preferred embodiment because it provides an interface between a PCI bus and an I/O bus 144.

From the point of view of a programmer, the PC 106 on the I/O node 104 is indistinguishable from a PC 106 included on the processor node 102. Similarly, memory at the I/O node 104 fully participates in the global cache coherence scheme of the multiprocessor system 100 (FIG. 1). The presence of a PC 106 on the I/O node 104 provides several benefits. For instance, it enables optimizations such as scheduling device drivers on this processor for lower latency access to I/O, or virtualization of the interface to various I/O devices (e.g., by having the PC 106 interpret accesses to virtual control registers). Except for the PCI/X interface 142, most of the modules on the I/O node 104 are identical in design to those on the processor node 102. For example, the same first-level data cache module (dL1) 110 that is used with the PCs 106 is also used to interface to the PCI/X module 142. The dL1 module 110 also provides the PCI/X interface 142 with address translation, access to I/O space registers, and interrupt generation. The I/O node 104 may also be customized to support other I/O standards such as Fibre Channel and System I/O.

Referring back to FIG. 1, the multiprocessor system 100 in a preferred embodiment allows for glueless scaling up to 1023 nodes 102, 104, with an arbitrary ratio of I/O nodes 104 to processing nodes 102. The ratio of I/O nodes 104 to processor nodes 102 is adjustable to match the resource needs of any particular workload. Furthermore, the router 126, 140 in each of the nodes 102, 104 supports arbitrary network topologies and allows for dynamic reconfigurability.

The I/O nodes 104 of the system are treated the same as processor nodes 102, that is, as full-fledged members of the multiprocessor system 100. In part, this design decision is based on the observation that available inter-chip bandwidth is best invested in a single switching fabric that forms a global resource utilized for both memory and I/O traffic.

In an alternate embodiment, one or more of the I/O nodes 104 of the system have no processor cores and therefore no L1 caches other than the L1 cache for the interface 142 to an I/O bus or device. Furthermore, a first subset of the no-processor core versions of I/O nodes 104 may also lack a memory subsystem 123, while other ones of the no-processor core versions of the I/O nodes do include a memory subsystem 123.

Processor Core and First-Level Caches

In a preferred embodiment, the PC 106 uses a single-issue, in-order design capable of executing the Alpha instruction set. It consists of a 500 MHz pipelined datapath with hardware support for floating-point operations. The pipeline has 8 stages: instruction fetch, register-read, ALU 1 through 5, and write-back. The 5-stage ALU supports pipelined floating-point and multiply instructions. However, most instructions execute in a single cycle. The PC 106 includes several performance enhancing features including a branch target buffer, pre-compute logic for branch conditions, and a fully bypassed datapath. The PC 106 interfaces with separate first-level instruction and data caches designed for single-cycle latency.

As will be described in more detail below, the system uses 64 KB two-way set-associative, blocking caches with virtual indices and physical tags. The L1 cache modules 108, 110 include tag compare logic, instruction and data translation lookaside buffers (TLBs) (each storing 256 entries in a 4-way associative caching arrangement), and a store buffer (data cache only). Each of the L1 cache modules 108, 110 also maintains a 2-bit state field per cache line, corresponding to the four states in a typical MESI protocol. For simplicity, the L1 instruction cache modules 108 and L1 data cache modules 110 use virtually the same design. Therefore, unlike other Alpha implementations, the instruction cache is kept coherent by hardware. Treating all cache modules 108, 110 in the same way also simplifies the implementation of a no-inclusion policy at the L2 level.

Figure 3:
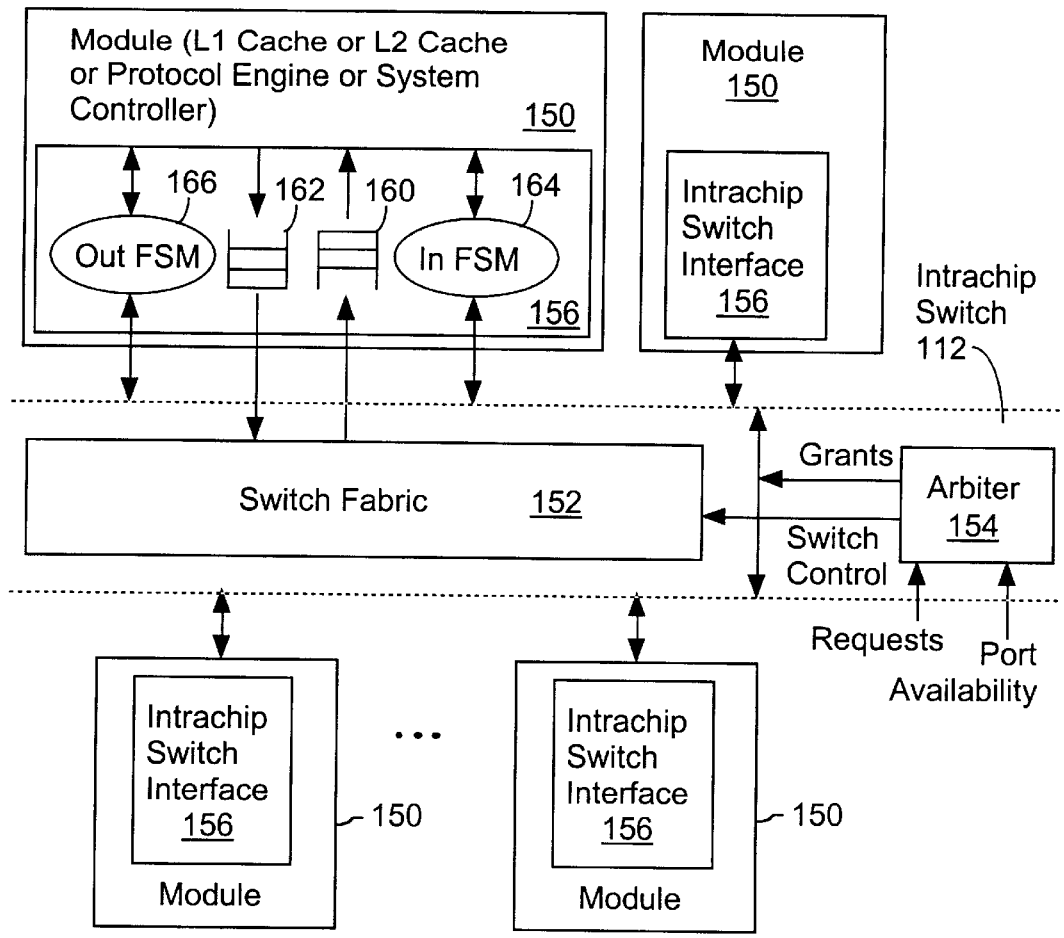
FIG. 3 is a block diagram of a intra-chip switch and the module interfaces used to couple the modules of a system node to the intra-chip switch.

Referring to FIG. 3, conceptually, the ICS 112 is a crossbar that interconnects most of the modules 150 on a processor node 102 or I/O node 104. The ICS 112 includes a switch fabric 152 and an arbiter 154 for determining which data transfer(s) to handle during each available data transfer period. The length of the data period depends on the number of transfers required to send one cache line across the ICS 112. In a preferred embodiment, each connection provided by the switch fabric 152 of the ICS 112 has a path width of 64 data bits, plus eight parity bits, for a total of 72 bits. Each cache line transported through the ICS 112 has 512 bits of data and sixty-four parity bits. Memory lines are transported along with the corresponding sixty-four parity bits when they are transported through the ICS 112. Parity bits for memory lines are also sent to and used in the L1 cache arrays. However, parity bits are not used in the L2 cache and they are also not used in main memory. Instead, in the L2 cache, 20 ECC bits are associated with each memory line, and more specifically a 10-bit ECC is associated with each 256-bit half memory line. In the L2 cache and main memory, the 64 bits otherwise available for use as parity bits are used instead to store the 20 ECC bits, as well as a 44-bit directory entry, which will be described in more detail below. Data transfers generally are sent with a command or transaction type indicator, which is transferred in parallel with the first 64 bits of data of the cache line. Each cache line sized data transfer requires eight clock cycles, with 64 bits of data and a proportional share of the parity and ECC bits being transferred during each clock cycle.

Arbitration and flow control are handled by the arbiter 154. To better understand the arbiter it is helpful to first review the interface 156 presented by each module 150 (i.e., L1 cache modules 108, 110, L2 cache, protocol engine or system controller) to the ICS 112. As shown in FIG. 3, the standard intra-chip interface 156 provided by each module includes one or more input buffers 160, one or more output buffers 162, a first finite state machine (FSM) 164 for controlling use of the input buffer(s) 160, and a second finite state machine (FSM) 166 for controlling use of the output buffer(s) 162. The arbiter 154, via the FSM 164, 166 of each module 150 keeps track of the availability of buffer space in the output buffers 162 of the modules 150 at all times, and exercises flow control by deferring requests to transfer data to modules with full input buffers 160. The arbiter 154 also receives all intra-chip data transfer requests from the interfaces 156 of the modules 150, and arbitrates between the requests whose destinations have input buffers 160 with sufficient room to receive a data transfer (i.e., a cache line of data).

In a preferred embodiment three parallel communication lanes, also called queues, are implemented in the input buffers 160 and output buffers 162 of the ICS interface 156, as well as in the input and output buffers of interfaces (not shown) to the packet switch 132 and interconnect 134 (see FIG. 1). These lanes or queues are labeled I/O, low priority and high priority, respectively. The high priority queues in the input and output buffers are used to store messages sent from a home node to another node of the system, replies from third party nodes to the home node or the requester node for a particular transaction, and messages internal to a node. The low priority queues are used to store messages going to the home node for a particular transaction. The low priority message are thus messages for initiating new memory transactions, while the high priority messages are messages for completing previously initiated memory transactions. The I/O queues are used for handling requests being sent to I/O devices. The messages in the I/O queues are given the lowest priority by the intrachip switch 112 and also by the packet switch 126 and interconnect 134 (see FIG. 1).

The use of multiple communication lanes generally increases the size of the input and output buffers in the interfaces to the ICS 112, packet switch 126 and interconnect 134. However, the use of multiple communication lanes is important for avoiding deadlock conditions in the network, and in particular for ensuring that active memory transactions make forward progress even when the system is experiencing high levels of protocol message traffic. In alternate embodiments, four or more communication lanes are used instead of three. In particular, in one alternate embodiment the high priority lane is replaced by two separate communication lanes, one for messages sent from the home node of a memory transaction and the other for replies sent by third parties to either the home node or any other node in the system. Providing the additional communication lane helps to ensure that messages sent by the home nodes of transactions are not blocked by reply messages being sent by the same node(s) for transactions in which those nodes are not the home node, and vice versa.

From a philosophical viewpoint, the ICS 112 is the primary facility for decomposing the processor node 102 and I/O node 104 into relatively independent, isolated modules 150. For instance, the transactional nature of the ICS 112 and the uniformity of the interfaces 156 presented by the modules 150 to the ICS 112 together allow different types of modules 150 to have different numbers of internal pipeline stages for handling various type of memory transactions.

The ICS 112 uses a unidirectional, push-only data transfer technique. The initiator of a memory transaction always sources data. If the destination of a transaction is ready, the arbiter 154 schedules the data transfer according to datapath availability. A grant is issued by the arbiter 154 to the initiator of the transaction to commence the data transfer at a rate of one 64-bit word per cycle without any further flow control. Concurrently, the destination receives a signal from the arbiter 154 that identifies the initiator and the type of transfer. Transfers across the ICS 112 are atomic operations.

Each port to the ICS 112 consists of two independent 64-bit data paths (plus additional datapath bits for eight parity bits) for sending and receiving data. The ICS 112 supports back-to-back transfers without dead-cycles between transfers. In order to reduce latency, in a preferred embodiment the modules 150 are allowed to issue a "pre-request" indicating the target destination of a future request, ahead of the actual transfer request. The pre-request is used by the ICS 112 to pre-allocate data paths and to speculatively assert a grant signal to the requester.

Directory Used in Cache Coherence Protocol

Figure 4:
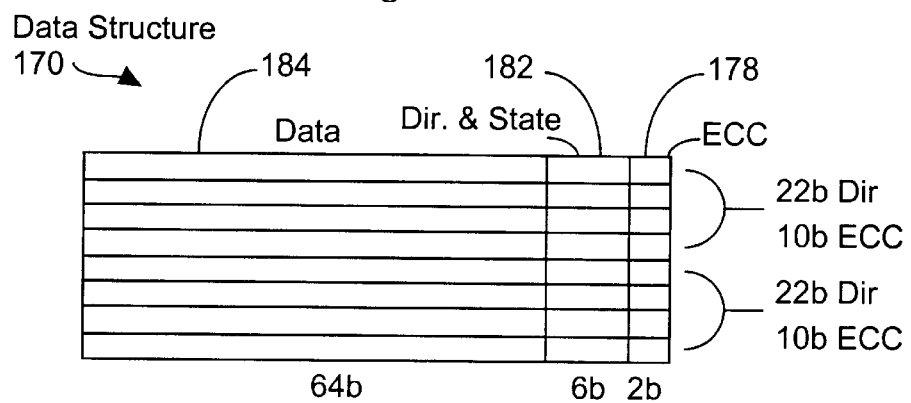
FIG. 4 depicts a data structure for a memory line and its associated directory entry and error correction code.
Figures 5, 6:
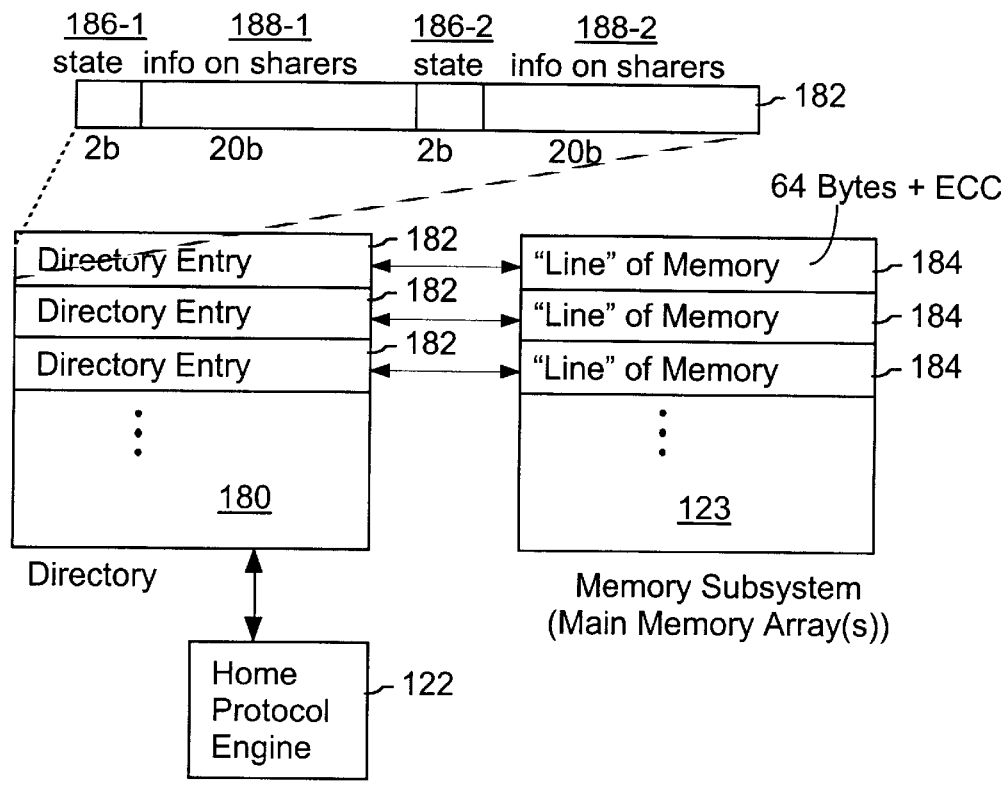
FIG. 5 depicts a directory data structure for keeping track of which nodes of the system have copies of each line of memory data.
FIG. 6 is a node assignment table for the sharer information field in the coarse vector format.

Referring to FIGS. 4 and 5, there is shown a data structure 170 for a 64 byte memory line of data 184 with its associated directory entry 182 and error correction bits 178. As described in more detail next, in the preferred embodiment each memory line 170 contains 512 bits (64 bytes, or eight 64-bit words) of data, and 64 bits (8 bytes) of directory and ECC information.

The memory subsystem 123 of a node is also called the main memory array of the node. The directory 180 for a node's memory subsystem 123 includes one directory entry 182 for each "memory line" 184 in the memory system 123. A "memory line" is the unit of memory that fits into one cache line of the L1 cache modules 108, 110 and L2 caches 114. In a preferred embodiment, a memory line is 512 bits (64 bytes, or eight 64-bit words) of data; however, the size of the memory line will vary from one implementation to another. Each memory line 184 also includes two 10-bit ECC (error correction code) codes (one for each half memory line). The 20 bits of ECC codes 178 and the 44-bit directory entry 182 occupy the same amount of memory, 64 bits, as would be required for one parity bit per byte. The ECC bits 178 are used only in main memory and the L2 cache to detect and correct errors in retrieved memory lines, while the directory entry 182 is used by the home protocol engine (HPE) 122 to maintain cache coherence of the memory lines 184 corresponding to the directory entries 182.

Each directory entry 182 includes a state field 186 for indicating the state of the corresponding memory line 184, and a sharer-information field 188 for identifying nodes 102, 104 that have or may have a copy of the corresponding memory line 184. A directory entry 182 in a preferred embodiment contains 44 bits, with the state field 186 comprising a 2-bit field that is repeated (i.e., stored twice in each directory entry 182) and the sharer-information field 188 comprising a 40-bit field that is split into two 20-bit fields 188-1, 188-2. In a preferred embodiment there are two possible formats for the sharer-information field 188, with the format of the sharer-information field 188 in a given directory entry 182 being determined by the number of nodes 102, 104 sharing the memory line 184 corresponding to the directory entry 182. Generally, a node 102, 104 is said to "share" a memory line 184 if it maintains a read-only copy of the memory line 184—typically stored in a cache array 108, 110, 114 within the respective node 102, 104.

In a preferred embodiment, the sharer-information field 188 identifies nodes other than the home node that have or may have a copy of the corresponding memory line 184. Information about whether the home node has a shared copy of the corresponding memory line is stored in the L2 cache, not in the sharer-information field 188 of the directory entry 182 for the memory line. Because the directory entry 182 does not indicate whether the home node has a shared copy of the corresponding memory line, there are a number of situations in which the memory logic of the present invention is able to avoid accessing the directory and also avoids having to read or update the ECC bits for the memory line. These situations will be described in detail below. By avoiding reading and updating the directory entry of memory lines in such situations, the load on the memory subsystem is reduced and memory access throughput is improved.

In a preferred embodiment (with a 40-bit sharer-information field and a maximum of 1023 nodes), when the number of nodes 102, 104 (other than the home node) currently sharing a memory line 184 is four or less, a first sharer-information field 188 format called the "limited-pointer" format is used. In this format, the 40-bit sharer-information field 188 is divided into four 10-bit sub-fields, each of which is used to store a "direct node pointer" that identifies a node 102, 104 that is a sharer of the memory line 184. A predefined null pointer value (e.g., 0x000 or 0x3FF) is stored in one or more of the 10-bit sub-fields to indicate that the respective 10-bit field does not identify a node 102, 104 (e.g., when fewer than four nodes 102, 104 share a memory line 184). More generally, the size of the sharer-information field 188 and the number of bits required for each direct node pointer determines the maximum number (DP) of direct node pointers that a sharer-information field 188 can store. Additionally, the node pointers (i.e., identifiers) included in the 10-bit sub-fields are obtained from requests to share a corresponding memory line of information 184. Thus, each request to share a memory line of information 184 (described in detail below), includes a 10-bit identifier of the requesting node.

Also, in a preferred embodiment, when the number of nodes 102, 104 sharing a memory line 184 is more than four, a second sharer-information field 188 format called the "coarse vector" format is used to identify the nodes that have or may have a copy of the memory line 184. In this format, when the number of nodes 102, 104 in the multiprocessor system 100 is more than four but less than forty-one, each bit of the sharer-information field 188 either corresponds to one node 102, 104 or does not correspond to any node 102, 104. Thus, a set bit (zero or one depending on the specific implementation) in the sharer-information field 188 of a given directory entry 182 indicates that the one node 102, 104 corresponding to the set bit shares the memory line 184 corresponding to the directory entry 182. And when the number of nodes 102, 104 in the multiprocessor system 100 is more than forty, one or more of the bits in the sharer-information field 188 correspond to a plurality of nodes 102, 104. Thus, a set bit (zero or one depending on the specific implementation) in the sharer-information field 188 of a given directory entry 182 indicates that the one or more nodes 102, 104 corresponding to the set bit has or may have a copy of the memory line 184 corresponding to the directory entry 182. When there are more than forty nodes in the multiprocessor system, the coarse vector format does not uniquely identify the nodes that have (or may have) shared copies of the memory line. Nevertheless, even in these circumstances, the coarse vector format identifies a subset of the system's nodes that may have shared copies of the memory line. As a result, while the nodes identified by the coarse vector may include some nodes that do not have shared copies of the memory line, the number of nodes to which invalidate messages must be sent when a node requests an exclusive copy of the memory line is nevertheless limited to the nodes identified by the coarse vector, as compared to having to send invalidate messages to all nodes of the system.

Because only one bit is used to identify one or more nodes 102, 104 when the sharer-information field 188 is in the coarse-vector format, each node 102, 104 in the multiprocessor system 100 must be mapped to a bit in the sharer-information field 188. The node to bit assignment table 189 of FIG. 6 illustrates a mapping of a plurality of nodes to a number of bits in a preferred embodiment (preferred embodiments of the invention do not actually utilize a table, which is included here merely for illustration). Specifically, table 189 shows 76 nodes 102, 104 mapped to respective bits in a 40-bit sharer-information field 188. Each column in table 189 is associated with a bit in the sharer-information field 188. Thus, according to table 189 the first bit in the sharer-information field 188 is associated with the node 102, 104 identified (and addressed) as 40. Since only 76 nodes 102, 104 are included in the multiprocessor system 100 of this example, table 189 includes only two rows. But if the number of nodes 102, 104 included in the multiprocessor system 100 in this example exceeded 79, 119, 159, etc., additional rows would be included in the table 189. In other words, additional nodes 102, 104 would be associated with one or more of the bits in the sharer-information field 188.

As indicated above, the numbers included in each entry of table 189 are node identifiers. The brackets around "0" are meant to indicate that 0 is not a valid node identifier in the embodiment illustrated in table 189. In this embodiment, zero is used in the limited-pointer format to indicate that a particular sub-field of the sharer-information field 188 does not identify a node 102, 104. To maintain consistency between the two formats, zero is not a valid node identifier in either format.

Determining the node identifiers for nodes 102, 104 associated with a given bit in a sharer-information field 188 (which permits the home node 102, 104 to send out invalidation requests when a given sharer-information field 188 is in the coarse-vector format) is divided into two basic steps. Assuming that a given bit is set and associated with column 3 of table 189 (FIG. 4), the first node 102, 104 associated with this bit is simply the column number, i.e., 3. To calculate subsequent node identifiers of nodes 102, 104 associated with this bit, the system adds to the column number positive integer multiples of the number of bits included in the sharer-information field 188 to the column number. For example, for column three of the sharer-information field, the associated system nodes are 3, 43, 83 and so on. The second step (i.e., adding multiples of the number of bits in the sharer-information field 188) is continued until the calculated node identifier exceeds the total number of nodes 102, 104 in multiprocessor system 100, in which case, the previously calculated node identifier is the identifier of the final node 102, 104 associated with a given bit.

As noted above, each directory entry 182 includes a state field 186. In a preferred embodiment, the state field 186 is set to one of the following defined states:

uncached (UNC): indicates that the corresponding memory line 184 is not shared by another node 102, 104; this directory entry state is sometimes called the "invalid" state;

exclusive (EXCL): indicates that a node 102, 104 has an exclusive copy of the corresponding memory line of information 184, and thus may make changes to the memory line of information 184;

shared-LP (SHR-LP): indicates that the sharer-information field 188 is configured in the limited-pointer format described above and that the number of nodes having a non-exclusive (i.e., shared) copy of the corresponding memory line of information 184 is less than or equal to DP (the maximum number of direct node pointers that the sharer-information field can store);

shared-CV (SHR-CV): indicates that more than DP nodes 102, 104 have a non-exclusive (i.e., shared) copy of the corresponding memory line of information 184 and that the sharer-information field 188 is configured in the coarse vector format described above.

Protocol Engines

Figure 7:
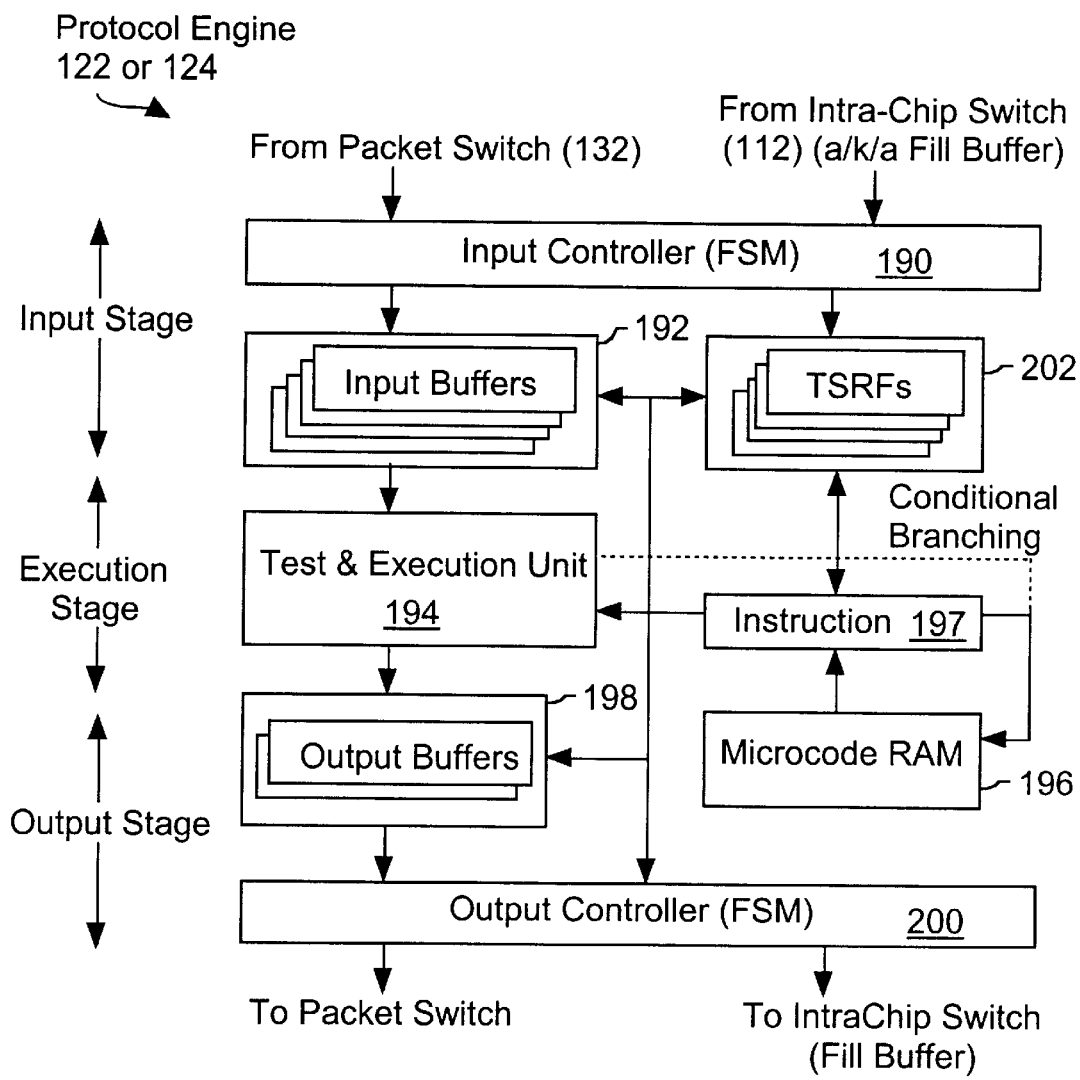
FIG. 7 is a block diagram of a protocol engine.

The basic architecture of each of the protocol engines 122, 124 (FIG. 1) is shown in FIG. 7. The protocol engines are responsible for handling memory transactions, such as the sharing of cache lines, the exclusive assignment of a cache line to a processor in a particular node of the system, remote read and write operations. The protocol engines 122, 124 are responsible for maintaining cache coherence of cache lines among the nodes 102, 104 of the multiprocessor system 100.

Each of the protocol engines 122, 124, as shown in FIG. 7, includes an input controller 190, preferably implemented as a finite state machine used in connection with a set of input buffers 192 for receiving data (inbound messages) from the ICS 112 and the PS 132. Received messages, some of which include a full cache line of data and the associated parity bits, are stored in the input buffers 192. In a preferred embodiment, sufficient input buffers 192 are provided to store inbound, received data for up to sixteen ongoing memory transactions. A test and execution unit 194 (herein called the execution unit) executes instructions obtained from an instruction memory 196, also called the microcode array, so as to advance memory transactions, also called cache coherence transactions. The currently selected instruction, obtained from the instruction memory 196, is held in a current instruction buffer 197 for decoding and execution by the execution unit 194. Output messages generated by the execution unit 194 are stored in output buffers 198, the operation of which are controlled by an output controller 200, preferably implemented as a finite state machine. The output messages are transferred from the output buffers 198 to specified destinations within the same node 102, 104 as the protocol engine 122, 124 via the ICS 112 or to specified destinations within other nodes 102, 104 of the multiprocessor system 100 via the PS 132.

The processor nodes 102 and I/O nodes 104 of a preferred embodiment use two protocol engines: a home protocol engine (HPE) 122 (FIG. 1) and a remote protocol engine (RPE) (124, FIG. 1). The home protocol engine (HPE) 122 (FIG. 1) handles memory transactions where the node 102, 104 in which the protocol engine 122 resides is the home node of the memory line that is the subject of the memory transaction. The remote protocol engine (RPE) (124, FIG. 1) handles memory transactions where a remote node 102, 104 is the home node of the memory line that is the subject of the memory transaction. For most purposes, the two protocol engines 122, 124 may be considered to be logically a single protocol engine.

The current state of multiple memory transactions is stored in a set of registers collectively called the Transient State Register File (TSRF) 202. Each memory transaction has a memory line address (sometimes called the global memory address) that identifies the memory line that is the subject of the memory transaction. More specifically, the memory line address identifies both the node 102, 104 interfacing with the memory subsystem 123 that stores the memory line of information 184 (i.e., the home node) and the specific position of the memory line of information 184 within the memory subsystem 123. In a preferred embodiment, the top M (e.g., 10) bits of the memory line address identify the home node 102, 104 of the memory line of information 184, while the remainder of the address bits identify the memory line 184 within the identified node. In a preferred embodiment, the memory line address for a memory line does not include any of the address bits used to identify sub-portions of the memory line, such as individual 64-bit words or individual bytes within the memory line of information 184. However, in other embodiments that support transactions on sub-portions of memory lines, the memory line addresses used may include bits for identifying such memory line sub-portions.

L1 Cache

Figure 8:
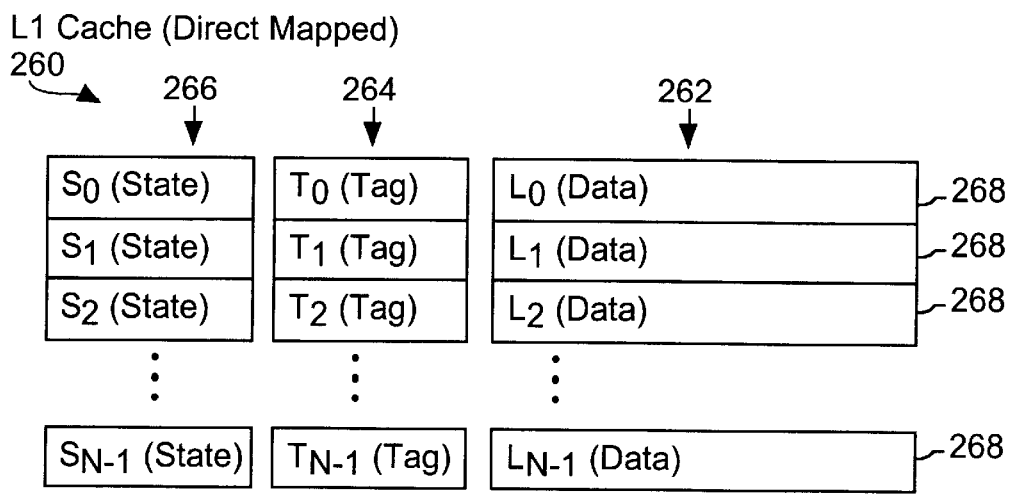
FIG. 8 depicts an embodiment of the Tag-State and Data arrays of an L1 cache.

Referring to FIG. 8, for simplicity a direct mapped version of the L1 cache 260 will be explained before explaining the two-way set associative version, shown in FIG. 9. Each L1 cache 260, whether it is a data or instruction cache (see FIG. 1) includes a data array 262 for storing cache lines, a tag array 264 and a state array 266. Each entry 268 of the L1 cache 260 includes a cache line, a tag and a state value. The cache line consists of the data from one memory line, and in a preferred embodiment this consists of 64 bytes (512 bits) of data plus parity and ECC bits corresponding to the 64 bytes.

The tag of each entry 268 consists of the address bits required to uniquely identify the cache line, if any, stored in the entry. Each address used to access memory consists of a string of address bits, ABCD, where A, B, C and D each consist of different groups of the address bits. The D bits are used to identify specific words (or bits, or bytes, depending on the implementation) within the cache line. The B and C bits, herein called BC, identify the entry 268 into which the memory line at address ABCO is stored within the L1 cache. The BC bits are called the index or cache index of the address. The A bits comprise the tag of the cache line, which together with the cache index uniquely identify the memory line. The only reason for dividing the cache index bits, BC, into two groups is for purposes of explaining the embodiment shown in FIG. 9.

The state of each L1 cache entry 268 is represented by two bits, which for each cache line represent one of four predefined states:

invalid, which means that the cache entry 268 is empty, or that the data in it is invalid and should not be used;

shared, which means that other processors or other nodes in the system have non-exclusive copies of the same memory line as the one stored in the cache entry;

clean_exclusive, which means that this L1 cache has the only copy of the associated memory line, has been allocated exclusive use thereof, and that the value of the cache line has not been changed by the processor coupled to the L1 cache; and dirty_exclusive, which means that this L1 cache has the only copy of the associated memory line, has been allocated exclusive use thereof, and that the value of the cache line has been changed by the processor coupled to the L1 cache.

Figure 9:
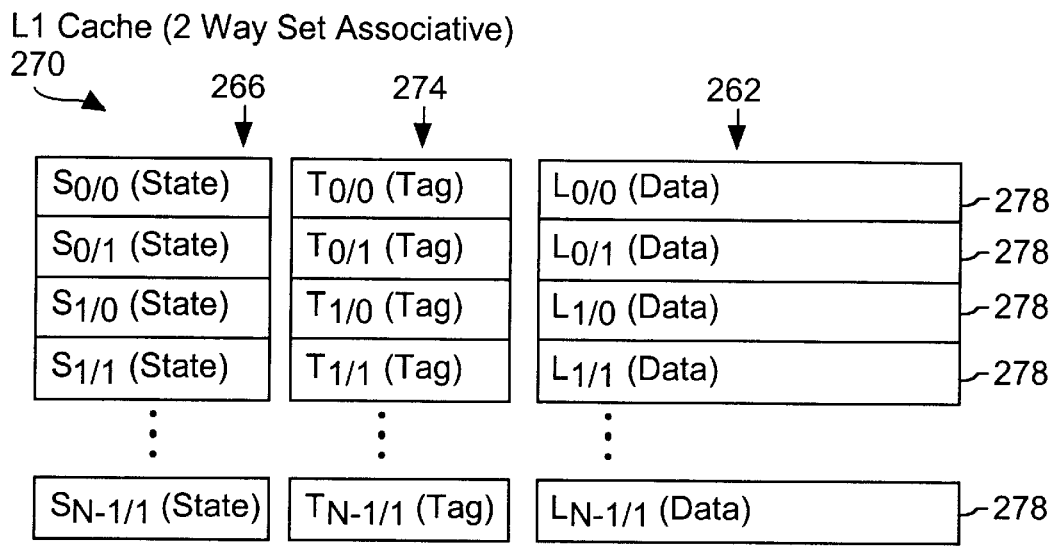
FIG. 9 depicts another embodiment of the Tag-State and Data arrays of an L1 cache.

Referring to FIG. 9, there is shown a two-way associative version of the L1 cache, which is an alternative implementation. Only the differences between the L1 caches of FIGS. 8 and 9 will be described. In particular, the set associative L1 cache 270 has the same number of entries 278 as the direct mapped L1 cache 260, but in this version there are two cache lines mapped to each cache index instead of just one. As a result, there are only half as many cache index values, and therefore the cache index is represented by just the C bits of the ABCD address bits. In this embodiment of the L1 cache, the B address bit of each memory line address is included in the tag of the entry, and thus the tag array 274 is one bit wider in this embodiment than in the direct mapped L1 cache embodiment. If the L1 cache were a four-way associative cache, the tag array 274 would be two bits wider than in the direct mapped L1 cache embodiment. A two-way associative L1 cache reduces cache evictions caused by cache index conflicts, but it requires additional circuitry for selecting the requested cache line from the two members of the associative set.

L2 Cache with Duplicate L1 Tags

Figure 10A:
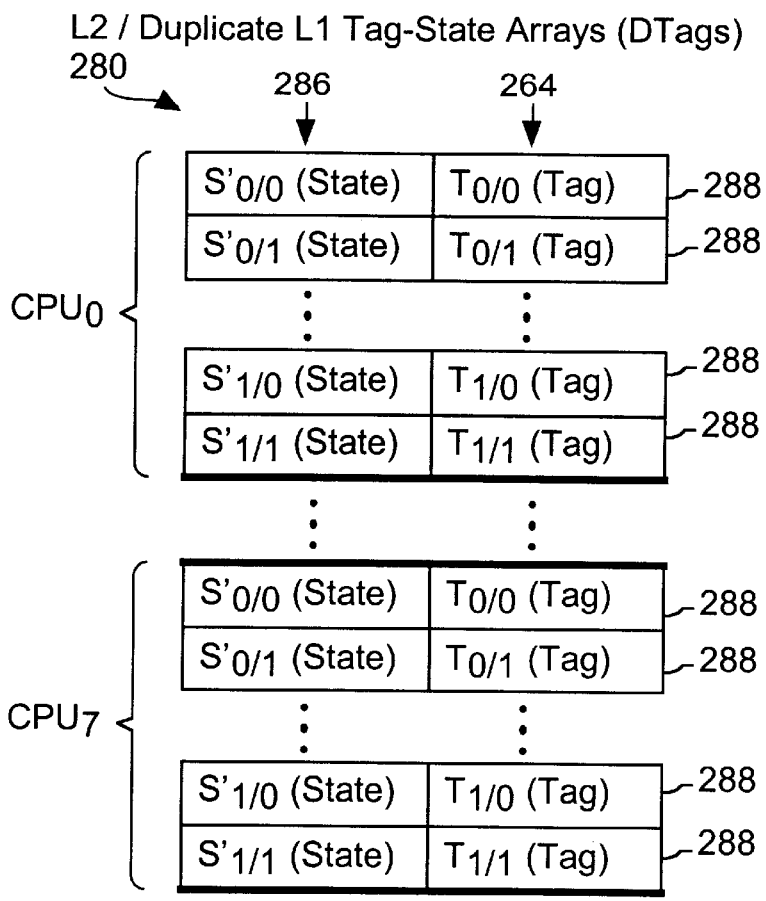
FIGS. 10A and 10B depict the duplicate tag, tag-state and data arrays of an L2 cache.

Referring to FIG. 10A, the L2 cache includes a set of "duplicate L1 tag and state arrays" 280. These "DTag" arrays 280 contain exact copies of the tag arrays of all the L1 caches in the same node as the L2 cache, and furthermore contain state information that is similar to, but not identical, to the state information in the L1 cache state arrays 266 (FIG. 9A). Thus, each entry 288 of the DTag arrays 280 corresponds to exactly one of the L1 cache entries 268 in the L1 caches of the node. The relationship between the state information in the L1 cache, the state information in the DTag arrays 280 of the L2 cache, and the state information in the L2 cache (see FIG. 10B) is as follows:

TABLE 1

| L1 state | DTag-L1 state | Possible corresponding L2 states |
|---|---|---|
| invalid | invalid | invalid, clean, clean_nodex, dirty |
| shared | shared_clean | invalid, clean, clean_nodex, dirty |
|  | shared_clean_owner | invalid |
|  | shared_clean_owner_nodex | invalid |
|  | shared_dirty | invalid |
| clean_exclusive | exclusive | invalid |
| dirty_exclusive |  | invalid |

As shown in Table 1 above, the L2 cache keeps additional information in the DTag arrays regarding the ownership of shared cache lines. The term "nodex" in Table 1 means "node-exclusive". The shared_clean_owner_nodex state for any particular cache line indicates that the cache line in the L1 cache has not been modified, and that this node is the exclusive owner of the cache line. The clean_nodex state in the L2 cache means the same thing.

An L1 cache line with a DTag state of exclusive, shared_dirty, shared_clean owner or shared_clean_owner_nodex is the owner of the cache line. If the L2 cache has a valid copy of the cache line, it is the owner of the cache line, and the only possible DTag states for that cache line are invalid or shared_clean. An L1 cache always performs a write-back when it replaces a cache line of which it is the owner. The written back cache line is loaded into the L2 cache, possibly victimizing another L2 cache line.

The L1 cache owner of a cache line responds to other L1 misses on the same cache line. In this case the requester of the cache line become the new owner and the previous owner's DTag state for the cache line is changed to shared_clean.

If a cache line is present in a particular node, node-exclusive information is kept in either the L2 state or the DTag state of the owner L1 cache. The L2 states clean_nodex and dirty, and the DTag states shared_clean_owner_nodex, shared_dirty and exclusive all indicate that the node is the only node in the system that is caching the identified memory line (i.e., identified by the tag and cache index of the cache line). In a preferred embodiment, dirty (i.e., modified) cache lines are never shared across nodes. Thus, if a node has a cache line that has been modified with respect to the memory copy, no other node in the system can have a copy of the line. As a result, when a node requests a shared copy of a cache line that has been modified by another node, the memory transaction that satisfies the request will always write-back the modified data to memory. Within a single node, however, a preferred embodiment allows sharing of a modified cache line among the processor cores. In this case, the DTag state of the L1 owner is set to shared_dirty and any other sharers have their DTag state set to shared_clean.

Figure 10B:
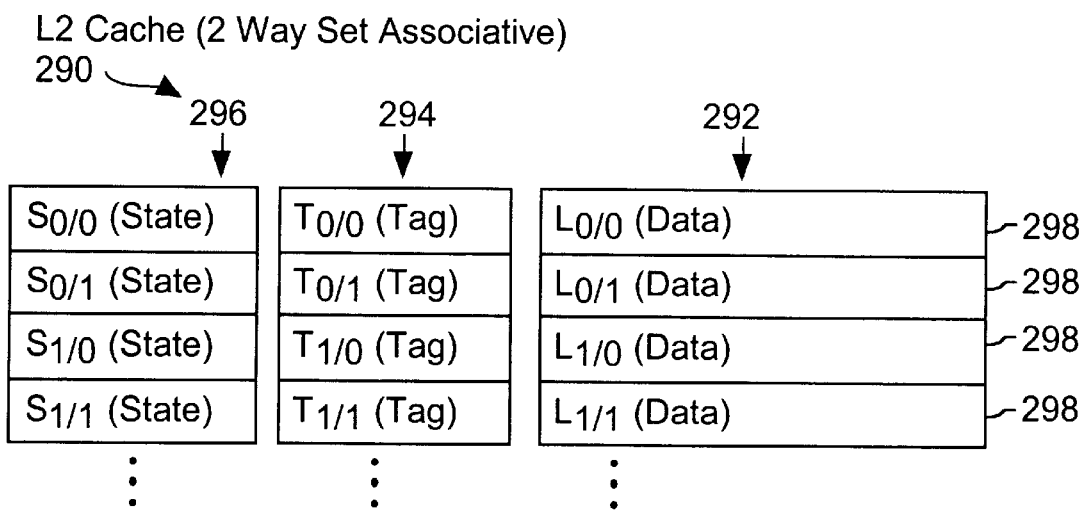

Referring to FIG. 10B, the main L2 cache array 290 includes a data array 292 for storing cache lines, a tag array 294 and a state array 296. The L2 cache array is preferably distributed across eight interleaved arrays, but for purposes of this explanation, the interleaved array structure is not shown, as it does not affect the logical organization and operation of the L2 cache. Each entry 298 of the L2 cache 260 includes a cache line, a tag and a state value. The cache line consists of the data from one memory line, and in a preferred embodiment this consists of 64 bytes (512 bits) of data plus parity and ECC bits corresponding to the 64 bytes.

The tag of each entry 268 consists of the address bits required to uniquely identify the cache line, if any, stored in the entry. Because the L2 cache is typically much larger than the L1 caches, a different subset of the address bits of a memory line address is used to identify the cache index and a different subset of the address bits is used as the tag compared with the address bits used for those purposes in the L1 caches.

The L2 cache line state value for each L2 cache entry is selected from among the following state values:
  invalid, which means that the cache entry 268 is empty, or that the data in it is invalid and should not be used;
  clean, which means that the value of the memory line has not been changed and is therefore the same as the copy in main memory, and furthermore means that copies of the cache line may be stored in (A) one or more of the L1 caches of the same node as the L2 cache and/or (B) the L1 or L2 caches in other nodes of the system, and that these copies are non-exclusive copies of the same memory line as the one stored in the L2 cache entry;
  clean_nodex (clean node-exclusive), which means that the L2 cache has a clean copy of the associated memory line (i.e., the memory line has not been changed and is the same as the copy in main memory), and that there may be cached copies of this memory line in local L1 caches in the same node as the L2 cache, but there are no copies of the memory line in any other nodes of the system; and
  dirty, which means that this L2 cache has the only copy of the associated memory line, and that the value of the cache line has been changed by one of the processor cores coupled to the L2 cache.

L2 Data Paths and Control Logic

Figure 11:
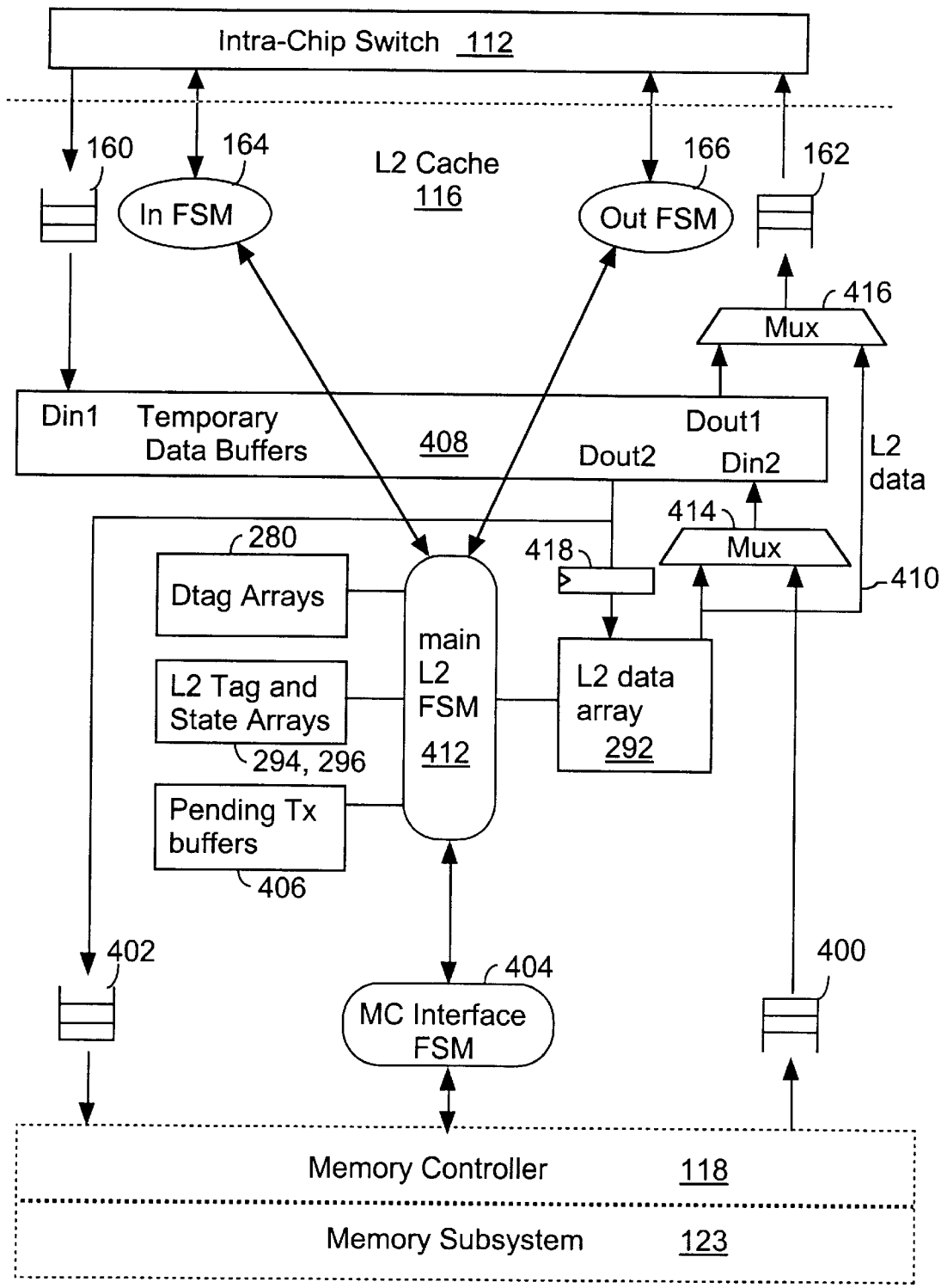
FIG. 11 shows the architecture of the L2 cache in more detail.

FIG. 11 shows the data paths and primary components of the L2 cache 116. As described earlier with respect to FIG. 3, the L2 cache has an interface to the intra-chip switch 112. This interface includes one or more input buffers 160, one or more output buffers 162, an input finite state machine (In FSM) 164 for controlling use of the input buffer(s) 160, and an output finite state machine (Out FSM) 166 for controlling use of the output buffer(s) 162. Similarly, the L2 cache 116 has an interface to the memory controller 118 (see also FIG. 1) that includes one or more input buffers 400, one or more output buffers 402 and a memory controller interface finite state machine (MC interface FSM) 404 for controlling the use of the MC interface input and output buffers 400, 402.

Pending buffers 406 are used to store status information about memory transactions pending in the L2 cache. For instance, the pending buffers 406 keep track of requests made to the memory subsystem (see FIG. 1) via the memory controller 118. Temporary data buffers 408 are used to temporarily store cache line data associated with pending memory transactions, including data being sourced to the L2 cache, data sourced from the L2 cache, and data transported through the L2 cache (i.e., from the memory subsystem 123 to the L1 cache). Data sent by the L2 cache in response to an L1 cache miss bypasses the temporary data buffers 408 and is sent via a bypass data path 410 so as to reduce latency when the L2 cache contains the data needed to satisfy a cache miss in an L1 cache (which is coupled to the L2 cache via the ICS 112).

The duplicate tag (DTag) arrays 280 and L2 tag and state arrays 294, 296 have been discussed above with reference to FIGS. 10A and 10B. Access to and updating of these arrays is handled by the main L2 finite state machine 412. The main L2 FSM 412 includes DTag and tag lookup, DTag and tag checking, and DTag, tag and state updating logic.

When an L1 cache miss is serviced by the L2 cache 116, and the L2 cache does not have a cached copy of the memory line required by the L1 cache, the request is forwarded to the memory subsystem 123 via the MC interface FSM 404. The memory line of information provided by the reply from the memory subsystem 123 is not stored in the L2 cache 116. Instead the memory line is sent directly to the L1 cache, bypassing the L2 data array 292. More specifically, the reply from the memory subsystem is directed through multiplexer 414 to the Din2 input port of the temporary data buffers 408. The reply is then output at the Dout1 port of the temporary data buffers 408 to the interface output buffer 162 via output multiplexer 416.

When an L1 cache evicts a memory line from the L1 cache, the victim memory line is sent to the L2 cache for storage via the ICS 112 and the interface input buffer 160. The victim memory line is received at the Din1 input port of the temporary data buffers 408 and temporarily stored therein. The victim memory line is then sent from the temporary data buffers 408 to the L2 data array 292, via the Dout2 port of the temporary data buffers 408 and a staging buffer 418, for storage in the L2 data array 292.

When the L2 cache sources a memory line to an L1 cache, the memory line read from the L2 data array 292 is conveyed via bypass line 410 to output multiplexer 416, and from there to the ICS interface output buffer 162. The output FSM 166 handles the transfer of the memory line from the output buffer 162 to the ICS 112, and from there it is sent to the L1 cache.

Duplicate tags (DTags) are used by the L2 cache to determine which L1 caches have cached copies of an identified memory line. The duplicate tags in the DTag arrays 280 are accessed by the main L2 FSM 412, and information derived from the duplicate tags is used to send messages via the output FSM 166 to one or more of the L1 caches in the same node as the L2 cache, or to other components of the node.

Transaction Request Types

The present invention includes a cache coherence protocol (CCP) that enables the sharing of memory lines of information 184 across multiple nodes 102, 104. The CCP, implemented by the HPE and RPE, uses an invalidation-based directory protocol with support for the following six request types: RD (read), RDEX (read-exclusive), EX (exclusive), ITOD (invalid to dirty), WB (write-back) and REPL (replacement).

A RD request is generated in response to a load command from the PC when a search for a memory line in the L1 and L2 caches results in a miss. A copy of the requested memory line is returned from the main memory to the requesting node, where it is stored in an L1 cache as a shared copy of the memory line.

A RDEX request is generated in response to a command from a PC to store a word in a memory line when a copy of the memory line that is to be written is not already in either the L2 or L1 caches of the requesting node. An exclusive copy of the memory line is returned to the requesting node so that the word may be stored with the remainder of the memory line. The source of the requested memory line may be either main memory of the memory line's home node, or another node that held a cached copy of the memory line. Because the copy that is written is an exclusive copy, all shared copies on other nodes (generated by prior RD requests) must be invalidated.

An EX request is also generated in response to a command from a PC to store a word in a memory line, but in contrast to a RDEX request, an EX request is issued when a shared copy of the memory line is in an L1 data cache of the requesting node. Because either the L2 or an L1 cache already has a shared copy of the memory line, a copy of the memory line does not need to be obtained from the home node's main memory or from another node. Rather, in order for the word to be written to an L1 cache line in the requesting node, the state of the memory line must be changed to exclusive, and all previously shared copies of the memory line must be invalidated. The state of the memory line is updated in the memory line's directory entry if (A) the requesting node is not the home node of the memory line, and/or (B) any nodes other than the home node contained shared copies of the memory line. The state of the requested memory line is updated only in the L1 and L2 caches of the home node when the requesting node is the home node and no other nodes have shared copies of the memory line.

An ITOD ("invalid to dirty") request is a variant of the EX request that is generated in response to a special store instruction, called "write hint 64" (WH64). An "invalid to dirty" request is a request to the home node to give the requester exclusive ownership on a particular memory line (so the memory line can be written) without actually sending the contents of the line to the requester. This request is useful when the requester intends to write the entire contents of the memory line and therefore does not need the original contents. Like an EX request, an ITOD request does not require a copy of the memory line to be returned from the main memory or from another node. However, in contrast to the EX request, a copy of the memory line that is to be written to is not necessarily located in an L1 data cache in the requesting node.

Finally, WB and REPL requests arise when an exclusive copy of a memory line is evicted from an L1 data cache. A WB request is issued when the evicted copy is dirty, i.e., its value has been changed by the processor having the exclusive copy. Because the memory line in the main memory is stale, the evicted memory line must be written to the main memory. A REPL request is issued when the evicted exclusive copy is clean, i.e., it has not been changed by the processor having the exclusive copy. Because the evicted memory line and the memory line in the main memory are the same, the evicted memory line does not need to be written to the main memory.

The preferred embodiment includes the following optimization for RD requests. A RD request may be automatically promoted to an exclusive request by the L2 module at the home node, if it determines that the memory line is not cached anywhere in the system. If such an exclusive line is eventually evicted by the requesting node while it is still clean, a REPL message is sent back to the home node. In the preferred embodiment, this is the only situation in which an exclusive cache copy remains clean when it is evicted. In other embodiments, the REPL request could be used in a wider variety of cache evictions of exclusively held, but unmodified cache lines. However, expanding the set of situations in which the REPL request can be used would require changes in the ECC generation and checking logic, and elsewhere in the cache coherence management logic.

The ECC-Based Directory Implementation

Referring again to FIG. 4, in accordance with the present invention, the directory and state information concerning which remote nodes have copies of memory lines stored in caches is located in the same DRAM bank in which the data is kept. Typical industry standard DRAM banks include 8 bits of ECC for each 64 bits of data. In one embodiment of the invention, a separate 10-bit ECC is calculated for each half of each memory line (i.e., for 256 bits of data, plus 22 bits of the memory line's 44-bit directory entry), instead of calculating a separate 8-bit ECC for each 64 bits of data. In other embodiments the ECC may be calculated over smaller or larger blocks of data. As FIG. 4 illustrates, if a separate ECC is calculated for each half memory line, the two ECC's for each 64-byte memory line occupy only 20 bits, rather than the 64 bits that would be required if a separate ECC were calculated for each 64 bits of data. As a result, 44 bits of the 64 supplemental bits per memory line are available for use as a memory directory entry. In a preferred embodiment the 44 bits for the directory entry are allocated between a 40-bit sharer information field 188 and a state field 186 comprising two repeated 2-bit state fields. Combining the data and directory in the DRAM banks through a coarser granularity ECC effectively results in zero storage overhead for the memory directory, and it also avoids the need for a separate set of pins and controller logic to access the memory directory.

The present invention uses a single ECC for both the data and directory, instead of using separate ECC's for the data and directory. Using a single ECC for both the data and directory reduces the number of bits required for the ECC, and thereby increases the number of bits available for the directory. For example, computing the ECC separately for the directory and data with a data ECC granularity of 128*b* requires 36 ECC bits for the data portion of each memory line and 7 ECC bits for the directory entry, leaving only 21 bits for the directory entry. If four ECC's are used, each for 128 bits of data and 7 bits of directory, then only 36 ECC bits are needed, leaving 28 bits for the directory entry. In another example, computing the ECC separately for each 256 bit block of data and another ECC for the directory entry requires 27 bits of ECC bits (20 for the data and 7 for the directory entry), leaving 37 bits for the directory entry, instead of 44 as in the preferred embodiment.

Using a single ECC for both data and directory works well for many coherence transactions, where both the data and directory need to be read or written. In such cases, the read or write to the directory effectively comes for free as part of the data operation. However, there are some important coherence transactions where only the directory needs to be accessed (e.g., when an exclusive copy of the memory line is at a remote node). These latter cases can lead to extra occupancy and bandwidth usage at the memory controllers compared to a system with separate data and directory storage. Furthermore, even though on-chip memory controllers provide fast access to memory (e.g., 40–60 ns), the fact that the whole memory line must be read to obtain the directory entry (because the ECC for the entire memory line, including data and directory, needs to be computed in order to verify any portion of the memory line) leads to potential latency concerns.

The present invention provides three means for eliminating or reducing the problems associated with using a combined ECC for the data and directory of each memory line. First, the present invention eliminates a number of memory accesses by augmenting the L2 cache state to keep track of whether data is exclusively cached at the home node. Second, memory bandwidth usage is reduced by calculating and storing partial ECC's in the L2 cache, and writing dummy data to memory (as explained below) in order to facilitate partial read and write accesses whenever possible. And third, the present invention provides for replicating directory state information in multiple sub-blocks of a memory line to allow a critical directory state to be constructed without requiring a full read of the memory line.

Home Protocol Engine and L2 Cache Handling of Transaction Requests

Referring to FIGS. 1 and 11, the respective roles of the home protocol engine (HPE) 122 and L2 Cache 116 in dealing with directory entries, ECC's and responding to requests for memory lines are as follows. The L2 cache contains logic for determining when it is necessary to access a requested memory line and/or its directory entry, while the HPE contains logic for submitting memory requests to the L2 cache, updating directory entries and passing the updated directory entries back to the L2 cache for storing in the main memory.

Requests from a remote node for a particular memory line are directed to and handled by the HPE of the requested memory line's home node. The HPE forwards the request to the L2 cache 116 of the home node. The L2 cache first determines whether the memory line is cached or exclusively cached in the L2 cache or any of the L1 caches of the home node. From the outcome of this initial determination, the L2 cache determines whether it is necessary to access the memory line and/or its directory entry in the host node's main memory. Requests by any of the processors of the home node for a memory line, caused by an L1 cache miss, are also initially handled by the L2 cache logic. In cases where a request by a processor in the home node requires the invalidation of shared copies of a memory line in other nodes, the L2 cache logic passes the directory entry of the memory line to the HPE along with a request for it to handle the invalidation of the shared copies in other nodes of the system.

The L2 cache logic is configured so that, whenever possible, unnecessary accesses to main memory are avoided. Similarly, in certain situations, described in detail below, it is unnecessary to update the directory entry of a requested memory line, either because the state remains unchanged, or because the L2 cache stores the only information needed

Augmenting the L2 Cache State

In accordance with the present invention, the directory does not include information about whether the L2 or a L1 cache in the home node has a copy of the memory line. Instead, as described above with reference to FIGS. 10A and 10B, the L2 cache includes information about whether a copy of the memory line is in the L2 or a L1 cache for the home node and whether the copy is exclusive (called "node-exclusive, or nodex, in Table 1). Using this information, the L2 memory logic (which is implemented as part of the L2 FSM 412, FIG. 11) avoids accessing the main memory in a number of cases, as shown in Tables 2 and 3 below.

TABLE 2

Directory Accesses Required for Local Home Requests When a Copy of the Requested Memory Line is in the Home Cache Memory

| Local Request | Home L2 State | Dir Read Required? | Dir Write Required? |
|---|---|---|---|
| RD | Valid | No | No |
|  | Node Excl. | No | No |
| RDEX | Valid | Yes | No |
|  | Node Excl. | No | No |
| EX | Valid | Yes | No |
|  | Node Excl. | No | No |
| ITOD | Valid | Yes | No |
|  | Node Excl. | No | No |
| WB | Valid | Not App. | Not App. |
|  | Node Excl. | No | Yes |
| REPL | Valid | Not App. | Not App. |
|  | Node Excl. | No | No |

For example, if the L2 or a L1 cache at the home node has a copy of the memory line, and there is a RD request from the home node, the request is satisfied from the cache without a read to main memory, and there is no need to update the directory by performing a write to main memory, because there is no change in the directory. In addition, if a cache at the home node has an exclusive copy of a memory line, and there is a RDEX, EX or ITOD request from the home node for the memory line, the request is also satisfied from the cache without a read to main memory. There is also no need to update the directory by performing a directory write, because again there is no change in the directory.

Main memory must be accessed in other circumstances, however, even though a cache in the home node has a copy of the requested memory line. For example, if the cache in the home node has a copy of a memory line, but it is not the exclusive copy, and there is a RDEX, EX or ITOD request from the home node for the memory line, a read from main memory is required so that the locations of any remote shared copies of the memory line may be determined from the directory so that they may be invalidated. (The invalidation messages are sent by the HPE, which is sent a copy of the directory entry for the memory line along with a command to send invalidation messages to all nodes that store or may store shared copies of the memory line.) There is no need to update the directory by performing a directory write to main memory after the request is satisfied, however, because an L1 cache in the home node will have the exclusive copy of the data, and that fact will be recorded in the DTags 280 (FIG. 11) of the L2 cache. It is not necessary for the directory in main memory to indicate that the home node has an exclusive copy of the memory line, or to overwrite the old and invalid copy of the directory entry, because a subsequent request for the memory line will be satisfied from the cache in the home node, and the L2 cache logic will prevent the invalid directory entry from being used.

WB and REPL requests from the home node are issued only when an L2 cache in the home node is evicting an exclusive copy of the memory line. No directory read is required for a WB or REPL request because the L2 cache in the home node already has the exclusive copy of the data. No write to main memory is required to update the directory after a REPL request, because the directory in the main memory does not maintain state information for the home node. That is, the directory entry for the memory line will already contain accurate information, indicating that no nodes other than the home node have a copy of the memory line. A write to main memory is required to update the memory line's data. Furthermore, a full data write is required for a WB request anyway, and so the write to main memory to update the directory entry for the memory line being written back to main memory incurs no overhead.

Referring to Table 2, when the L2 cache state is invalid, indicating that a copy of the requested cache line is not stored in any of the home node's caches, a main memory access is required to respond to the local memory line request.

As is summarized in Table 3 below, the need to access the main memory is also eliminated for several situations involving transaction requests from remote nodes.

TABLE 3

Directory Accesses Required for Remote Requests When a Copy of the Requested Memory Line is in the Home Cache Memory

| Remote Request | Home L2 State | Dir Read Required? | Dir Write Required? |
|---|---|---|---|
| RD | Valid | Yes | Yes |
|  | Node Excl. | No | Yes |
| RDEX | Valid | Yes | Yes |
|  | Node Excl. | No | Yes |
| EX | Valid | Yes | Yes |
|  | Node Excl. | No | Not App. |
| ITOD | Valid | Yes | Yes |
|  | Node Excl. | No | Yes |
| WB | Valid | No | Not App. |
|  | Node Excl. | No | Not App. |
| REPL | Valid | No | Not App. |
|  | Node Excl. | No | Not App. |

For example, if a cache in the home node has the exclusive copy of a memory line needed for a RD, RDEX, EX or ITOD request, the request is satisfied from the cache without a read from main memory. In other words, the request is responded to by sending a copy of the memory line from the home node's cache plus a predefined null directory entry. The predefined null directory entry is the value of a directory entry, and its directory state bits, when there are no sharers of a memory line other than the home node. A write to main memory is required, however, because the directory contents must be changed as a result of any of these requests. A write to main memory is not applicable to the circumstance where the home node has the exclusive copy of a memory line and there is an EX request from a remote node, because an EX request from a remote node (which means that the remote node has a shared copy of the memory line) is inconsistent with the home node having the exclusive copy of the memory line. Once it is determined that the home node has the exclusive copy of the memory line, the EX request is discarded, because it could only have been the result of a race condition in which the remote node issued the EX request before its shared copy of the memory line was invalidated.

If the home node's cache system has a copy of the memory line and the copy is not exclusive (as indicated by a "VALID" home L2 state in Table 3), both a read from main memory and a write to main memory is required for a RD, RDEX, EX or ITOD request. In the case of a RD request, the read from main memory retrieves a copy of the memory line to be sent to the requester. In this case it is known in advance that the memory line data in the main memory is valid (i.e., not stale) because the home node's cache system has a non-exclusive copy of the memory line. Also, in the case of a RD request, a write to main memory is required to update the directory to indicate that the requesting node has a shared copy of the memory line. Updating the directory at the completion of the transaction also requires a read from main memory to determine from the directory the other remote nodes that have shared copies of the memory line. In the case of a RDEX, EX or ITOD request, a read from main memory is required to determine which remote nodes, if any, have shared copies of the memory line so that the shared copes may be invalidated. Also, a write to main memory is required when the transaction is completed to update the directory to indicate that the requesting node has the exclusive copy of the memory line.

Finally, writes to main memory are not applicable to WB or REPL requests if a cache in the home node has a copy of the memory line, since a WB or a REPL request should be issued only if the requesting remote node has the exclusive copy of the memory line. Once it is determined that the home node has a copy of the memory line, the WB or REPL request is discarded, because it could only have been the result of the following race condition: the remote node issued the WB or REPL request, but another node has claimed ownership of the memory line before the WB or REPL request could reach the home node of the memory line.

It should be noted that in all cases in which a memory access is avoided, both DRAM occupancy (i.e., the total number of memory cycles needed to complete a given sequence of reads and/or writes) and request latency are reduced, because both the data and the (inferred) directory can be supplied by the L2 cache without having to wait for a DRAM read cycle. Augmenting the L2 cache state to keep track of whether data is exclusively cached at the home node can be seen as a restricted form of directory caching. In an alternate embodiment an actual directory cache could be added to further improve efficiency of coherence maintenance at the cost of additional hardware and complexity.

Partial ECC's and Dummy Data Writes

Augmenting the L2 cache state to indicate whether the home node has exclusive copies of memory lines eliminates many memory accesses that would otherwise be required for reading and writing directory information, but it does not eliminate all of them. Furthermore, the use of a combined ECC for both memory line data and its directory entry would require additional, burdensome main memory accesses if a straightforward directory access methodology were used. The present invention uses partial memory reads and writes, and stores partial ECC values to reduce the number of memory accesses to nearly the number that would be required if separate ECC's for the data and directory were used instead of a combined ECC.

In order to appreciate this invention, it is necessary to understand that, in a straightforward directory access implementation, transaction requests typically require two memory reads and a memory write to access a directory having a combined ECC. For example, a RD request (if a cache in the home node does not have an exclusive copy of the requested memory line) would require an initial read to the main memory in the home node (memRD1) to ascertain from the directory whether the memory line is stale because a cache in a remote node has an exclusive copy of the memory line. After the memory line was copied from either the main memory or the remote cache with the exclusive copy to an L1 cache in the requesting node, the directory in the main memory would have to be updated. With a combined ECC, updating the directory would require recalculating the ECC for both the directory entry and the memory line's data. In order to recalculate the ECC for both the directory entry and the memory line's data, a second read (memRD2) of the main memory would be required to obtain the data (even if the data was not being changed) so that it could be combined with the new directory information to compute a new ECC for the memory line. Finally, a write (memWR) of the main memory would be required to store the updated directory along with the memory line's data in the main memory. Buffering the entire memory line in the home node between the first read (memRD1) and the write (memWR) in order to avoid the second read (memRD2) is not practical because of buffering constraints. In addition, a high-performance cache controller has to support multiple outstanding cache operations, and buffering the entire memory line for each pending cache transaction (to enable the calculation of a correct ECC without having to read the memory line from main memory a second time) would be prohibitive.

The potential cost of performing two memory reads and a memory write when having to access the main memory is substantially avoided in the present invention by computing and storing a partial ECC for the data portion of a memory line when it is retrieved from main memory, and, for transaction requests which result in the memory line becoming stale, using dummy data for computing the combined ECC to be written to the main memory.

The use of partial ECC calculations eliminates the second memory read (memRD2) for nearly all transaction requests. Whenever a first memory read is performed to access the main memory, a memory controller or specialized ECC hardware in the cache of the home node performs an ECC calculation on the memory line in order to verify that the data being read is accurate. An ECC encoder computes a partial ECC on the data bits alone so that the partial ECC can later be combined with the directory bits to obtain a combined ECC for the data and directory bits. It will be apparent to those skilled in the art that a number of Single-Error-Correction, Double-Error-Detection codes are suitable for this purpose. The partial ECC is stored in a pending transaction buffer. The partial ECC in the pending transaction buffer is accessed during a later phase of the transaction to compute the combined ECC for the data and directory bits when the data has not been changed as a result of the transaction but the directory needs to be updated.

Figure 12:
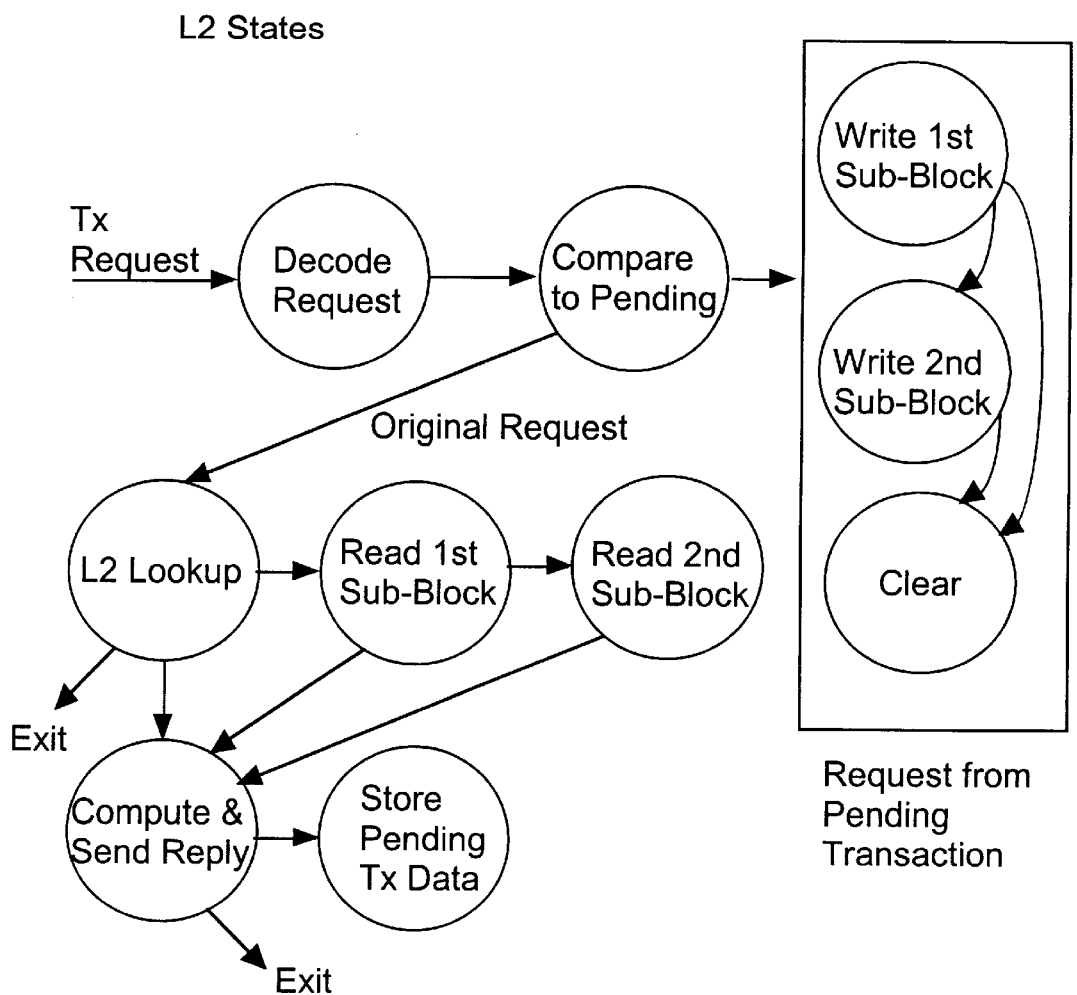
FIG. 12 is an L2 state diagram.

Referring to FIG. 12, there is shown a state diagram for the L2 cache in a home node illustrating the processing of a transaction request. The transaction request is decoded and compared to the pending transaction buffer to determine if the transaction request is an original request or a follow-up request (also called a transaction completion request) for a pending transaction. If the transaction request is an original request, the L2 cache performs a lookup of the Dtag array 280 (FIG. 10A) and the main L2 cache array 290 (FIG. 10B) to locate the requested memory line. If an exclusive copy of the requested memory line is found through the L2 cache lookup, the L2 cache returns the exclusive copy to complete the transaction request. Otherwise, the memory line is read from the main memory in two sub-blocks. This operation is called the memRD1 operation. In the memRD1 operation, if the data or directory entry needed for the transaction request is located in the first sub-block, only the first sub-block is read; otherwise, both sub-blocks are read. As each sub-block is read, the partial ECC for the sub-block is computed and stored in the pending transaction buffer. The combined ECC for the data and directory in the sub-block is also computed, and the computed combined ECC is compared to the ECC bits in the memory line. If the transaction request is a follow-up request (i.e., a transaction completion request) for a pending transaction, no memRD2 operation is required because the combined ECC may be obtained from the partial ECC and updated directory information provided in the transaction request. In other words, storing the partial ECC in the pending transaction buffer makes the memRD2 operation unnecessary. In those transactions where only the directory information is updated, the follow up transaction request is serviced using only a memWR operation (i.e., without a memRD operation). Furthermore, the memWR operation is performed on one or both sub-blocks of the memory line, depending on whether the transaction request may be satisfied by a write to just one the memory line's sub-blocks. For instance, if only half of the directory entry for a memory line requires updating, and the directory state remains unchanged, then only one of the memory line's sub-blocks needs to be updated.

Figure 13:
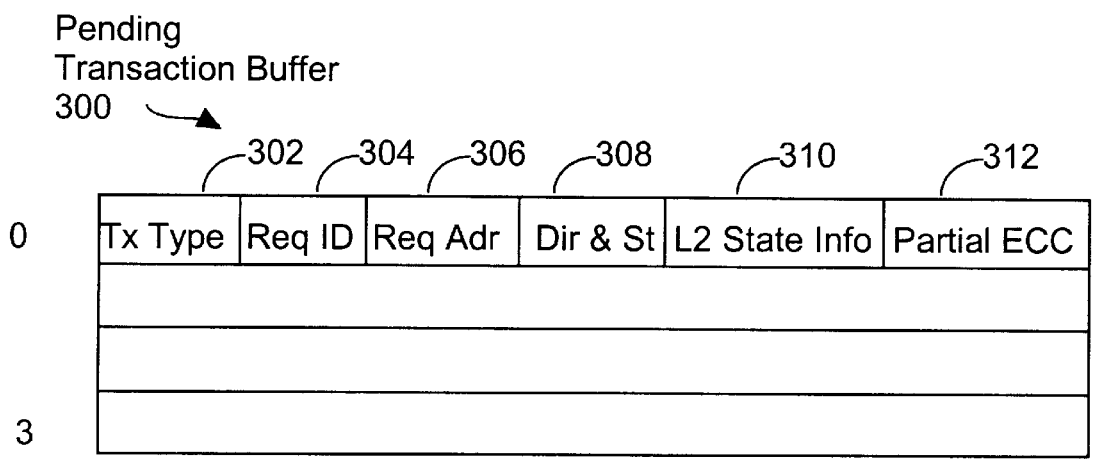
FIG. 13 is a diagram of an L2 pending transaction buffer.

FIG. 13 is a diagram of the pending transaction buffer 300. The contents of the pending transaction buffer 300 include the transaction type 302, the requester ID 304, the request address 306, directory and state information fields 308, and L2 state information 310. Finally, twenty bits are allocated for the partial ECC 312, including ten bits for the partial ECC for each sub-block of a memory line.

Figure 14A:
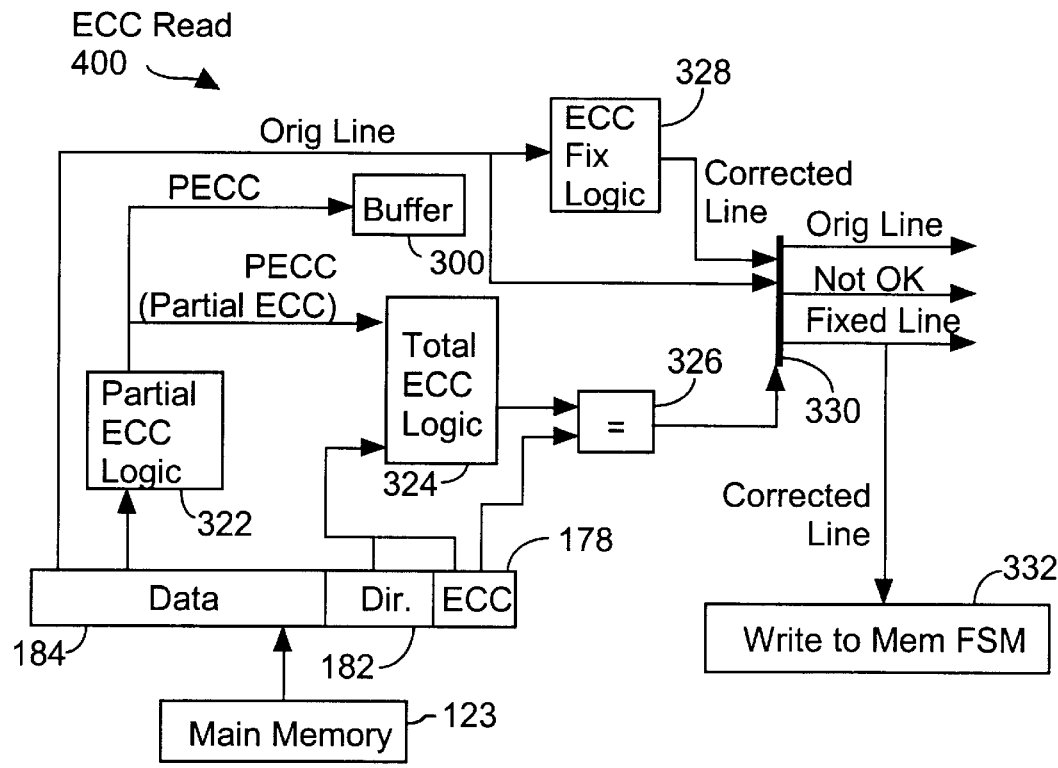
FIGS. 14A and 14B are block diagrams of error correction code read logic.
Figure 14B:
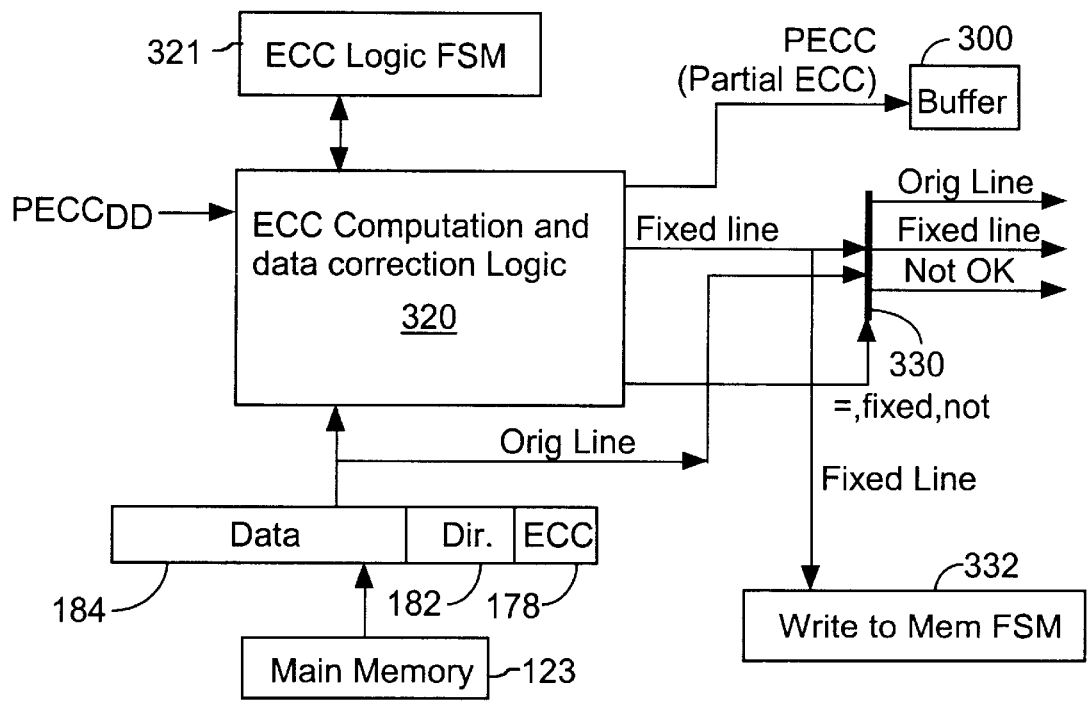

FIGS. 14A and 14B are block diagrams illustrating the operation of ECC circuitry in a memRD1 operation. FIG. 14A depicts one possibly implementation, handling various operations with separate circuits, while FIG. 14B depicts a preferred embodiment. Referring to FIG. 14A, partial ECC Logic 322 receives data in a memory line 184 from the main memory 123 and computes a partial ECC (PECC) based on the data in the memory line 184. The computed partial ECC is stored in the pending transaction buffer 300.

The Total ECC Logic 324 receives the partial ECC and also the directory and state information bits 182 for the same memory line 184. From these, the Total ECC Logic 324 computes a combined ECC. In some embodiments the Partial ECC Logic 322 and Total ECC Logic 324 may be combined into a single logic circuit. The combined ECC from the Total ECC Logic 324 is then sent to a comparator 326, where it is compared to the combined ECC 178 retrieved from main memory along with the memory line. Concurrently with the computation and comparison of the combined ECC, a corrected memory line is generated by ECC Fix Logic 328 and sent to a multiplexer 330 controlled by the comparator 326. If the combined ECC from the Total ECC Logic 324 matches the combined ECC for the data in the memory line 184 and the directory and state information 182, the multiplexer 330 outputs the memory line 184. If the comparator indicates that the memory line requires correction and the ECC Fix Logic 328 determines that the memory line is correctable, the multiplexer 330 outputs the corrected memory line, which is also written to main memory by a Write to Memory Finite State Machine 332. Finally, if the comparator ECC fix logic 328 determines that the memory line 184 is not correctable, the multiplexer 330 outputs an appropriate signal (labeled "Not OK in FIGS. 14A and 14B).

Referring to FIG. 14B, the ECC generation circuitry is preferably implemented with an ECC computation and data correction circuit 320 that is controlled by an ECC logic finite state machine (FSM) 321. Only the aspects of FIG. 14B that differ from FIG. 14A will be described. The ECC logic FSM 321 has three phases of operation. In a first phase, the data portion of a half memory line is processed to produce a partial ECC value, which is then stored in a pending transaction buffer 300. In a second phase, the generation of the combined ECC value for the memory line sub-block continues, using the partial ECC as its starting point, by processing the directory portion (including both the state and sharer information bits of the directory) of a memory line sub-block. At the end of the second phase, an ECC value for the memory line sub-block, including both data and directory entry, has been generated by the ECC logic 320. In a third phase, the ECC portion of the memory line sub-block is processed to determine if the ECC portion of the memory line sub-block matches the computed ECC value for the memory line sub-block. If not, a corrected memory line sub-block (called the "fixed line" in the figures) is generated, if possible, and if a corrected memory line sub-block cannot be computed by the ECC logic 320, an error signal (labeled "Not OK" in the figures) is generated by the ECC logic 320.

A memory line in main memory becomes stale as a result of a RDEX, EX or ITOD transaction request, because the memory line is modified by the requesting node. Nevertheless, a read to main memory is required to obtain directory information so that an exclusive copy of the memory line may be read from another remote node or shared copies of the memory line may be invalidated, and the directory and ECC's must be updated at the completion of the transaction. These memory accesses may be limited to partial reads and writes in many cases if the directory state is stored in a sub-block part of the memory line. Moreover, if the memory line in the main memory becomes stale as a result of a transaction request, a second memory read (memRD2) is not necessary for calculating a combined ECC in order to perform a memory write at the completion of the transaction. Instead, a write is used to write predefined dummy date (e.g., zeros, or any other predefined data pattern), the updated directory entry and a combined ECC for the dummy data and updated directory entry. The predefined dummy data is used to compute the combined ECC for memory lines having stale data, which enables the memory system to avoid reading one of the two memory line sub-blocks during the memRD1 operation when the directory state of the memory line is EXCL (because the data and directory content of the second memory line sub-block are fully known from reading the first memory line sub-block). In the preferred embodiment, the partial ECC, $PECC_{DD}$, for the predefined dummy data is computed in advance, and that pre-computed value is preferably used, along with the directory entry, to generate the combined ECC for the memory line sub-block.

Figure 15:
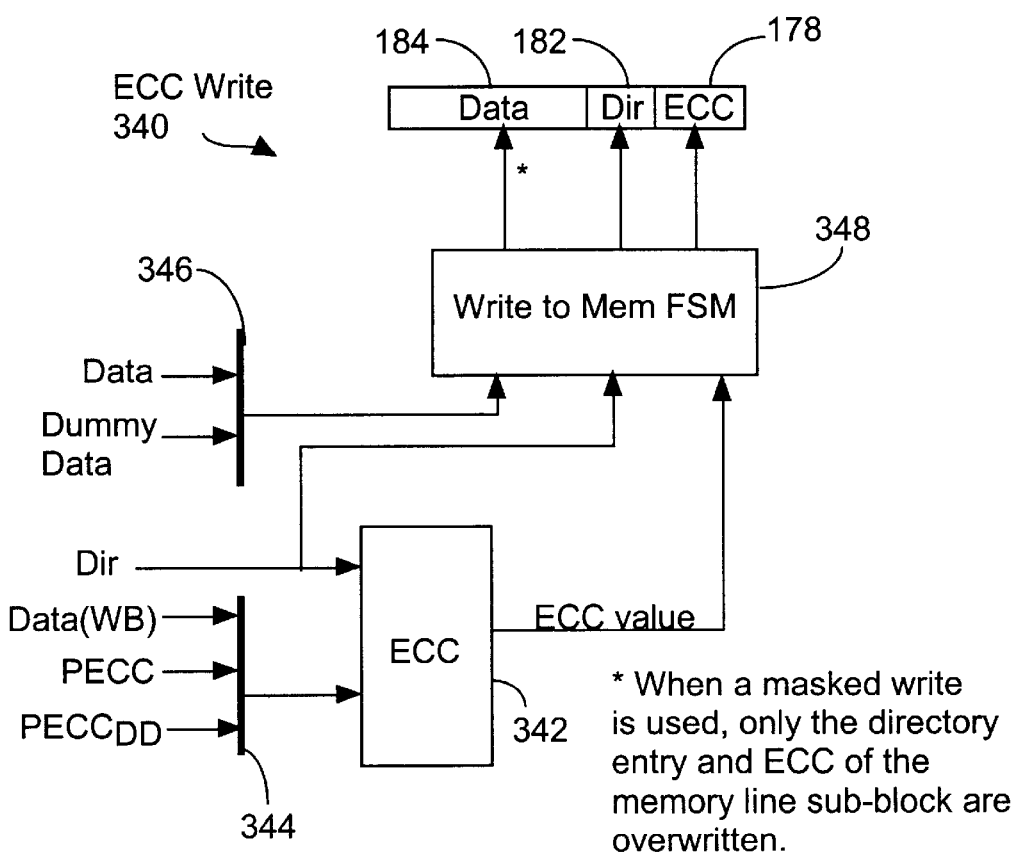
FIG. 15 is a block diagram of error correction code write logic.

FIG. 15 is a block diagram illustrating the operation of ECC circuitry in a memWR operation. Except during write back (WB) operations, the combined ECC to be written to the main memory is calculated by the ECC circuitry 342 from the updated directory information and a partial ECC, selected by a first multiplexer 344 from either the partial ECC calculated in a memRD1 operation or from a predefined partial ECC value (PECC$_{DD}$) for the dummy data. The PECC$_{DD}$ value is used only if the transaction request is a RDEX, EX or ITOD request, all of which make stale the data stored in main memory for the specified memory line. During write back (WB) operations, the combined ECC to be written to the main memory is calculated by the ECC circuitry 342 from the updated directory information and the memory line data being written back to main memory. A second multiplexer 346 selects whether actual data or dummy data is provided to the Write to Memory FSM 348. For transactions (e.g., RD) that update only the directory entry, but not the data, of a memory line, a masked write is used so as to avoid overwriting the data portion of the memory line.

The use of the partial ECC's and dummy data writes in the present invention is illustrated in Table 4, which is described below. Table 4 illustrates partial ECC's and "dummy data writes" without implementing critical-word-first (CWF) ordering. A preferred embodiment implements CWF ordering, however, and this embodiment is discussed subsequently.

TABLE 4

Directory Accesses Required for Remote Requests When A Memory Access Is Required

| Remote Request | Directory State | memRD1 Required? | memRD2 Required? | memWR Required? |
|---|---|---|---|---|
| RD | UNC | Yes (for data) | No (PECC) | Yes (½) |
|  | SHR | Yes (for data) | No (PECC) | Yes (½ or full) |
|  | EXCL | Yes (½) | No | Yes (for data) |
| RDEX | UNC | Yes (for data) | No (PECC/DDW) | Yes (½) |
|  | SHR | Yes (for data) | No (PECC/DDW) | Yes (½ or full) |
|  | EXCL | Yes (½) | No (PECC/DDW) | Yes (½) |
| EX | UNC | Yes (½) | Not App. (Race) | Not App. (Race) |
|  | SHR | Yes (½ or full) | No (PECC/DDW) | Yes (½ or full) |
|  | EXCL | Yes (½) | Not App. (Race) | Not App. (Race) |
| ITOD | UNC | Yes (½) | No (PECC/DDW) | Yes (½) |
|  | SHR | Yes (½) | No (PECC/DDW) | Yes (½ or full) |
|  | EXCL | Yes (½) | No (PECC/DDW) | Yes (½) |
| WB | UNC | Yes (½) | Not App. (Race) | Not App. (Race) |
|  | SHR | Yes (½) | Not App. (Race) | Not App. (Race) |
|  | EXCL | Yes (½) | No | Yes (for data) |
| REPL | UNC | Yes (½) | Not App. (Race) | Not App. (Race) |
|  | SHR | Yes (½) | Not App. (Race) | Not App. (Race) |
|  | EXCL | Yes (½) | No (PECC) | Yes (½) |

A RD request from a remote node requires a full read of the memory line if the directory state is UNC or SHR, and the directory is read along with the data. As the data is read, the partial ECC is calculated and retained in the pending transaction buffer. After a copy of the memory line is sent to the remote node, the directory state must be updated to reflect that the remote node has a shared copy of the memory line. Updating the directory state requires a write to main memory, even though the data in main memory is not changed as a result of the RD request. Nevertheless, a second memory read (memRD2) is not needed because the partial ECC is used to calculate the new combined ECC for the data and updated directory. Since the data is not changed, a masked write operation is performed in which only the directory and ECC bits are stored in the main memory. The directory may be updated using only a partial memory write (to half of the memory block) if the initial directory state was UNC, or if the initial directory state was SHR and only half of the updated directory is needed to record the remote nodes with shared copies of the memory line after the transaction request is completed (e.g., if only one or two remote nodes have shared copies of the data). A full directory write is required if both halves of the main memory block are needed to record the remote nodes with shared copies of the memory line (e.g., if three or more remote nodes have shared copies of the data after the transaction request is completed).

If the initial directory state is EXCL, a read of the directory is required to ascertain that is the case, and the memory line must be copied from the cache that has the exclusive copy to the cache in the requesting node. A partial read (a read of the first sub-block of the memory line) will suffice to determine that the directory state is EXCL, and also to determine which node has the exclusive copy of the memory line. At the completion of the transaction request, the memory line must be written back to the main memory from the cache that previously had the exclusive copy, and the directory must be updated to reflect that two nodes now have shared copies of the memory line.

A RDEX request from a remote node requires a full read of the memory line if the directory state is UNC or SHR, and the directory is read along with the data. As the data is read, the partial ECC is calculated and retained in the pending transaction buffer. After the memory line is sent to the remote node, the directory must be updated to reflect that the remote node now has an exclusive copy of the memory line. A second memory read (memRD2) is not needed because the memory line's data is stale and dummy data will be written to the main memory to replace the stale data and used to calculate the combined ECC for the dummy data and directory. If the original directory state was SHR and only half of the directory was used to record the nodes with shared copies of the memory line (e.g., if only one or two nodes had shared copies of the data), only a partial memory write is required to update the directory to indicate the remote node with the exclusive copy of the memory line. If the original directory state was SHR and both halves of the directory were used to record the nodes with shared copies of the memory line (e.g., if three or more nodes had shared copies of the data), a full memory write is required to remove outdated sharer information from both halves of the directory.

If the directory state of the memory line is EXCL, the data in the main memory is already stale, and so a copy of the memory line must be obtained from the node with the exclusive copy, rather than from the main memory, in response to a RDEX request from a remote node. A read of the first sub-block of the memory line is required to ascertain from the directory the location of the node with the exclusive copy. After the copy of the memory line is sent to the requesting node, the directory must be updated to reflect that a different node now has the exclusive copy of the memory line. A second memory read (memRD2) is not needed because the partial ECC may be used to calculate the new combined ECC for the data and updated directory. Alternatively, dummy data may be written to the main memory to replace its stale data and used to calculate the combined ECC for the dummy data and directory. Only a memory write to the first sub-block of the memory line is required to update the directory to indicate the remote node that now has the exclusive copy of the memory line.

An EX request from a remote node occurs when the remote node has a shared copy of the memory line in main memory, and the remote node needs to have the exclusive copy so that it can modify the memory line. Although a copy of the memory line is not required in response to an EX request, a directory read is required to identify all the other nodes, if any, that have shared copies of the memory. Those other shared copies must be invalidated and the directory state must be updated after the transaction is completed to show that the requesting node has the exclusive copy of the memory line. An EX request implies that the directory state is SHR; nevertheless, it is possible for the directory state in the main memory to be UNC or EXCL if there is a "race condition" involving the memory line in question. The race condition would result from another node requesting exclusive use of the same memory line, requiring invalidation of all other shared copies of the memory line, and the requesting remote node not having received the invalidation request for the memory line prior to the time it issued its EX request. A partial memory read (memRD1) is required to ascertain that the directory state is UNC or EXCL, and then the race condition is resolved by simply dropping (i.e., ignoring) the EX request. In this situation the EX request does not require a response, because the requesting node will receive the invalidation request that was sent prior to the receipt of the EX request, and the requesting node will then know that its EX request has been dropped.

If the directory state is SHR, a directory read is required for an EX request, even though it is not necessary to obtain a copy of the memory line for the remote node. Only a partial read (memRD1) is required if, from reading the first half of the directory entry, it can be determined that there is no sharer information in the second half of the directory entry. Otherwise a full read of the memory line is require in order to obtain both halves of the directory entry. In the preferred embodiment, if there is more than one sharer for the memory line (other than the home node), then both halves of the memory line must be read. This is because when there are two sharer node values in the first half of the directory entry, the second half of the directory entry must be read in order to determine whether it contains any sharer information.

After the shared copies of the memory line have been invalidated (e.g., by invalidation messages sent out the HPE of the home node), the directory must be updated to reflect that the requesting remote node now has the exclusive copy of the memory line. Depending on whether a half or the full directory entry was needed to record the nodes that previously contained shared copies of the memory line, either a partial or full memory write is required to update the directory entry to indicate the node with the exclusive copy and to delete the sharer information for the other sharers. If the second half of the directory entry contains no sharer information, it is acceptable to have the state value in that half of the directory entry temporarily denote an incorrect state, because the directory state in the second half of the directory will be corrected the next time that there is a need to update the second half of the memory line. Preferably, the memory line in main memory is overwritten with predefined dummy data, and the combined ECC for the updated memory line sub-block(s) is calculated using the updated directory entry and the predefined dummy data. Alternately, a masked write may be used to overwrite only the updated directory entry, in which case the combined ECC for the updated memory line sub-block(s) is calculated using the updated directory entry and the partial ECC computed when the memory line sub-block was read, in the memRD1 operation.

An ITOD request differs from an EX request in that the requesting node does not necessarily have a copy of the memory line. In contrast to an RDEX request, however, a copy of the memory line is not needed for an ITOD request. If the initial directory state is SHR, an ITOD request is handled in the same way as an EX request. In contrast to an EX request, the initial directory state for an ITOD request may be UNC or EXCL without there being a race condition. If the initial directory state is UNC, a partial read of the memory line is required to determine that is the case. Similarly, if the initial directory state is EXCL, a read of the first sub-block of the memory line is required to determine that is the case. When the initial directory state is either UNC or SHR, the directory is updated (in response to an ITOD request) to reflect that the requesting node has the exclusive copy of the memory line and furthermore the memory line's data is overwritten with predefined dummy data. Thus, the combined ECC for the memory line is computed using the updated directory entry and the pre-computed partial ECC value ($PECC_{DD}$) for the dummy data. When the initial directory state is EXCL, the memory line in main memory may already contain dummy data. However, it is possible that the memory line in main memory contains stale data (e.g., due to a prior RD operation being promoted to an exclusive read operation). Therefore, in the preferred embodiment, a full write is nevertheless used to write both dummy data and an update directory entry to main memory, and the ECC for the memory line is computed based on the dummy data (or its pre-computed partial ECC, $PECC_{DD}$) and the updated directory entry.

In the absence of a race condition, a WB or REPL request should be issued only if the requesting node has the exclusive copy of the memory line. If another node requested a copy of the memory line prior to the home node's receipt of the WB or REPL request, then the directory state will be SHR when the WB or REPL request is received, indicating that there is a race condition. Similarly, if the directory state is UNC when the WB or REPL request is received, that is also indicative of a race condition (e.g., where one node after another obtains exclusive ownership of a memory line and then performs a WB, with the "second" WB request beating the first WB request to the home node). In a third race scenario, the WB request finds the directory state to be exclusive, but the owner of the memory line is a different node than the one performing the WB. In all of these race condition situations, a partial memory read (memRD1) is required to ascertain the directory state (and owner of the memory line if the directory state is EXCL), and then the race condition is resolved by dropping the WB or REPL request. If the prior directory state is EXCL, which is the most common case when a WB or REPL request is received, a partial memory read (memRD1) is required to ascertain that the prior directory state is EXCL and that the owner of the memory line is the node requesting the WB, and then a full data write is required to complete a WB request. The full data write stores to main memory the memory line data received from the requesting node, a directory state of UNC, and a blank or predefined null directory entry indicating that there are no sharers of the memory line.

No data write is required for a REPL request, but the directory must be updated. The new directory value and the previously generated partial ECC are used to generate the combined ECC for the memory line, without having to perform a memRD2 operation, and a memory write to the first sub-block is required to record that the new directory state is UNC.

Replication of Directory State Information

The embodiments described above do not include critical-word-first (CWF) ordering. CWF ordering is used in most high-performance processors, and consists of presenting the miss reply in an order such that the missed word is delivered first, allowing the processor to resume execution earlier, and therefore reducing the exposed miss latency. However, the L2 controller needs to inspect the directory state of a requested memory line before it can determine whether to obtain the response data from the main memory of the home node or from elsewhere in the system (e.g., from one of the other nodes). For instance, if the directory state is EXCL, the data in memory is stale and therefore should not be returned to the requester. If the directory state were stored in only one sub-block of a memory line, and the CWF ordering of a particular request happens to first fetch the sub-block in which the directory state resides, there is no further latency penalty. Unfortunately, given that CWF ordering is random, one can expect that 50% of the time the CWF sub-block will not be the one that contains the directory state bits. In those cases, a full block store-and-forward penalty (as high as 30 ns in high-end DRAM systems) will be incurred.

A preferred embodiment of this invention replicates the directory state bits in both sub-blocks of each memory line in order to guarantee that, regardless of CWF ordering, the first sub-block to be fetched includes the directory state. This replication of the directory state improves miss latencies in many cases, but it also reduces the number of cases where a partial memWR operation is sufficient for modifying the directory. This is because both copies of the state bits need to be updated for any directory state changes, requiring the use of a full memWR operation. Nonetheless, the benefits of the lower miss latency made possible by state replication outweigh the negative effects of the increased use of memory bandwidth by full memWR operations.

Table 5 below illustrates the use of partial ECC's and dummy data writes in a preferred embodiment of the present invention in which directory state information is replicated in both sub-blocks of the memory line in order to enable CWF ordering of memory fetch requests.

TABLE 5

Directory Accesses Required for Remote Requests When A Memory Access Is Required With Critical-Word-First Ordering and Replication of State Information

| Remote Request | Directory State | memRD1 Required? | memRD2 Required? | memWR Required? |
|---|---|---|---|---|
| RD | UNC | Yes (for data) | No (PECC) | Yes (full) |
| | SHR | Yes (for data) | No (PECC) | Yes (½ or full) |
| | EXCL | Yes (½ or full) | No | Yes (for data) |
| RDEX | UNC | Yes (for data) | No (PECC/DDW) | Yes (full) |
| | SHR | Yes (for data) | No (PECC/DDW) | Yes (full) |
| | EXCL | Yes (½ or full) | No (PECC/DDW) | Yes (½) |
| EX | UNC | Yes (½) | Not App. (Race) | Not App. (Race) |
| | SHR | Yes (½) | No (DDW) | Yes (full) |
| | | Yes (full) | No (PECC/DDW) | Yes (full) |
| | EXCL | Yes (½) | Not App. (Race) | Not App. (Race) |
| ITOD | UNC | Yes (½) | No (DDW) | Yes (full) |
| | SHR | Yes (½) | No (DDW) | Yes (full) |
| | | Yes (full) | No (PECC/DDW) | Yes (full) |
| | EXCL | Yes (½) | No (PECC/DDW) | Yes (½) |
| WB | UNC | Yes (½) | Not App. (Race) | Not App. (Race) |
| | SHR | Yes (½) | Not App. (Race) | Not App. (Race) |
| | EXCL | Yes (½) | No | Yes (for data) |

TABLE 5-continued

Directory Accesses Required for Remote Requests When A Memory Access Is Required With Critical-Word-First Ordering and Replication of State Information

| Remote Request | Directory State | memRD1 Required? | memRD2 Required? | memWR Required? |
|---|---|---|---|---|
| REPL | UNC | Yes (½) | Not App. (Race) | Not App. (Race) |
| | SHR | Yes (½) | Not App. (Race) | Not App. (Race) |
| | EXCL | Yes (full) | No (PECC) | Yes (full) |

A comparison of Tables 4 and 5 reveals that many of the directory accesses are the same, regardless of whether there is replication of the directory states or not. Accordingly, only the directory accesses for transaction requests and directory states which differ are discussed below.

In the absence of CWF ordering, a RD or RDEX request requires only a partial read of the memory line, if the initial directory state is EXCL, in order to determine the location of the remote node with the exclusive copy of the memory line. With CWF ordering, though, the critical word (which is read first) is not necessarily in the sub-block that has the directory field indicating the location of the remote node with the exclusive copy. Even though the directory state is replicated in both sub-blocks, the directory field with the location of the remote node with the exclusive copy of the memory line is not. Therefore, if the critical word is located in the second sub-block and the directory field with the location of the remote node is in the first sub-block, both sub-blocks must be read in order to determine the location of the remote node with the exclusive copy.

Another difference introduced by state replication is that state replication requires a full memory write after a RD request where the initial directory state is UNC. In the absence of state replication, only a partial memory write is needed to record that the requesting node has a shared copy of the memory line. State replication requires a full memory write so that both sub-blocks will indicate that the new directory state is SHR.

Similarly, state replication requires full memory writes after RDEX, EX and ITOD requests if the initial directory state is UNC or SHR. In the absence of state replication, only a partial memory write at the completion of RDEX, EX and ITOD requests is needed to record that the requesting node has the exclusive copy of the memory line; state replication requires a full memory write so that the directory state is recorded in both sub-blocks.

The means for responding to EX and ITOD requests if the initial directory state is SHR also differs on account of state replication. With or without state replication, a partial read (memRD1) is required if only half of the directory entry was used to record the nodes with shared copies of the memory line, but a full read is required if both halves of the directory were used to record the nodes with shared copies of the memory line. As noted in the preceding paragraph, though, state replication requires a full memory write in order to record the new directory state in both sub-blocks. The partial ECC's cannot be used to generate the combined ECC's for both sub-blocks if the partial ECC was calculated for only one of the sub-blocks in a partial memory read operation. Consequently, dummy data must be used to generate the combined ECC for one of the two sub-blocks in a full memory write after a partial memory read in response to an EX or ITOD request where the initial directory state is SHR. In contrast, either the partial ECC or dummy data can be used to generate the combined ECC after a partial memory read in the absence of state replication.

Finally, state replication requires a full memory write in response to a REPL request from a remote node with the exclusive clean copy of the memory line in order to record that the new directory state is UNC in both sub-blocks of the memory line. A full memory write at the completion of the REPL request requires a full memory read (memRD1) at its beginning so that the partial ECC for both sub-blocks can be calculated and stored. The partial ECC must be used to update the directory entry, rather than dummy data, because the main memory will have the only copy of the memory line when the REPL operation is completed.

Inspection of Table 5 shows that the need for a second memory read (memRD2) is totally eliminated and in the majority of the cases, the memRD1 overhead is reduced to only a half bock access. Similar reductions would also apply to the memWR overhead if not for state replication, which may nevertheless be desirable because it often reduces miss latencies.

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A multiprocessor computer system comprising a plurality of nodes, each respective node including:
    a main memory storing data in a plurality of memory lines with a directory entry for each memory line; wherein each memory line stored in the main memory of the respective node has a home node comprising the respective node;
    a cache memory system storing copies of memory lines from the main memories in the plurality of nodes; and
    logic;
    wherein each directory entry in the main memory of each respective node indicates whether a copy of the corresponding memory line is stored in the cache memory system in another node;
    wherein the cache memory system of each respective node includes, for each copy of each memory line stored in the cache memory system of the respective node, cache state information indicating whether the copy is an exclusive copy of the memory line; and
    wherein the logic of each respective node is configured to respond to a transaction request for a particular memory line and its corresponding directory entry, when the cache memory system of the respective node stores a copy of the particular memory line and the cache state information indicates that the copy of the particular memory line is an exclusive copy, by retrieving the copy of the particular memory line from the cache memory system of the respective node and sending the retrieved copy and a predefined null directory entry value.

2. The system of claim 1, wherein the logic is further configured to respond to the transaction request, when the cache memory system of the respective node does not store an exclusive copy of the particular memory line, by retrieving the particular memory line and the corresponding directory entry from the main memory of the respective node and sending the retrieved particular memory line and corresponding directory entry.

3. The system of claim 1, wherein the logic is further configured to respond to a transaction request from the home node for a particular memory line and its corresponding directory entry, when the transaction request requires an exclusive copy of the particular memory line to be stored in the cache memory system of the home node, by completing the transaction request without changing the corresponding directory entry.

4. The system of claim 1, wherein the logic is further configured to respond to a read request from the home node for a particular memory line and its corresponding directory entry, when the cache memory system of the home node stores a copy of the particular memory line, by sending the copy of the particular memory line retrieved from the cache memory system and completing the read request without changing the corresponding directory entry.

5. The system of claim 1, wherein the logic is further configured to mark the cache state information to indicate that a copy of a respective memory line stored in the cache memory system of the home node of the respective memory line is an exclusive copy when the cache memory system issues a read request for the respective memory line and the corresponding directory entry for the respective memory line indicates that no cache memory system other than the cache memory system has a copy of the respective memory line, and when the cache memory system issues a write request for the respective memory line.

6. A multiprocessor computer system comprising a plurality of nodes, each respective node including:
    a main memory storing data in a plurality of memory lines, each memory line having a corresponding directory entry and a combined error correction code, the combined error correction code for detecting and correcting errors in both the memory line and the directory entry for the memory line; and
    a cache memory system for storing copies of memory lines from the main memories in the plurality of nodes;
    wherein each directory entry in the main memory of each node indicates whether a copy of the corresponding memory line is stored in the cache memory system in another node.

7. The system of claim 6, wherein
    N is an integer greater than 1;
    each memory line is stored in the main memory in N sub-blocks, each memory line sub-block including a portion of the memory line data and a portion of the directory entry corresponding to the memory line; and
    the combined error correction code for each memory line comprises N sub-block combined error correction codes, each sub-block combined error correction code for detecting and correcting errors in both the memory line portion and directory entry portion in a corresponding memory line sub-block.

8. The system of claim 7, wherein:
    each memory line stored in the main memory of the respective node has a home node comprising the respective node;
    the cache memory system of each respective node includes, for each copy of each memory line stored in the cache memory system of the respective node, cache state information indicating whether the copy is an exclusive copy of the memory line; and
    each respective node further includes logic configured to respond to a transaction request for a particular memory line and its corresponding directory entry, when the cache memory system of the respective node stores a copy of the particular memory line and the cache state information indicates that the copy of the particular memory line is an exclusive copy, by retrieving the copy of the particular memory line from the cache memory system of the respective node and sending the retrieved copy and a predefined null directory entry value.

9. The system of claim 8, wherein the logic is further configured to respond to the transaction request, when the cache memory system of the respective node does not store an exclusive copy of the particular memory line, by retrieving the particular memory line and the corresponding directory entry from the main memory of the respective node and sending the retrieved particular memory line and corresponding directory entry.

10. The system of claim 8, wherein the logic is further configured to respond to a transaction request from the home node for a particular memory line and its corresponding directory entry, when the transaction request requires an exclusive copy of the particular memory line to be stored in the cache memory system of the respective node, by completing the transaction request without changing the corresponding directory entry.

11. The system of claim 8, wherein the logic is further configured to respond to a read request from the home node for a particular memory line and its corresponding directory entry, when the cache memory system of the home node stores a copy of the particular memory line, by sending the copy of the particular memory line retrieved from the cache memory system and a predefined null directory entry value and completing the read request without changing the corresponding directory entry.

12. The system of claim 8, wherein the logic is further configured to mark the cache state information to indicate that a copy of a respective memory line stored in the cache memory system of the home node is an exclusive copy when the cache memory system issues a read request for the respective memory line and the corresponding directory entry for the respective memory line indicates that no cache memory system other than the cache memory system has a copy of the respective memory line, and when the cache memory system issues a write request for the respective memory line.

13. The system of claim 7, wherein each node further includes:
  read logic configured to respond to a transaction request for a specified memory line and its corresponding directory entry, the read logic including
    error correction code circuitry for generating a partial error correction code for the specified memory line, based on data in the specified memory line alone without the corresponding directory entry; and
    a buffer for storing the partial error correction code in the buffer; and
  update logic configured to respond to a transaction completion request for the specified memory line, specifying a new directory entry for the specified memory line, the update logic configuring the error correction code circuitry to generate a new combined error correction code for the specified memory line based on the partial error correction code stored in the buffer and the new directory entry.

14. The system of claim 13, further including write circuitry for writing the new directory entry and the new combined error correction code to main memory without overwriting the specified memory line.

15. The system of claim 14, wherein the transaction completion request is a request from a remote node for a memory line for which current, non-stale, data is stored in the main memory of the respective node.

16. The system of claim 14, wherein:
  each memory line stored in the main memory of the respective node has a home node comprising the respective node;
  the cache memory system of each respective node includes, for each copy of each memory line stored in the cache memory system of the respective node, cache state information indicating whether the copy is an exclusive copy of the memory line; and
  the read logic is further configured to respond to a transaction request for a particular memory line and its corresponding directory entry, when the cache memory system of the respective node stores a copy of the particular memory line and the cache state information indicates that the copy of the particular memory line is an exclusive copy, by retrieving the copy of the particular memory line from the cache memory system of the respective node and sending the retrieved copy and a predefined null directory entry value.

17. The system of claim 16, wherein the read logic is further configured to respond to the transaction request, when the cache memory system of the respective node does not store a copy of the particular memory line, by retrieving the particular memory line and the corresponding directory entry from the main memory of the respective node and sending the retrieved particular memory line and corresponding directory entry.

18. The system of claim 16, wherein the logic is further configured to respond to a transaction request from the home node for a particular memory line and its corresponding directory entry, when the transaction request requires an exclusive copy of the particular memory line to be stored in the cache memory system of the respective node, by completing the transaction request without changing the corresponding directory entry.

19. The system of claim 16, wherein the logic is further configured to respond to a read request from the home node for a particular memory line and its corresponding directory entry, when the cache memory system of the home node stores a copy of the particular memory line, by sending the copy of the particular memory line retrieved from the cache memory system and a predefined null directory entry value and completing the read request without changing the corresponding directory entry.

20. The system of claim 16, wherein the logic is further configured to mark the cache state information to indicate that a copy of a respective memory line stored in the cache memory system of the home node is an exclusive copy when the cache memory system issues a read request for the respective memory line and the corresponding directory entry for the respective memory line indicates that no cache memory system other than the cache memory system has a copy of the respective memory line, and when the cache memory system issues a write request for the respective memory line.

21. The system of claim 7, wherein each node further includes update logic configured to respond to a transaction completion request for a specified memory line, the transaction completion request specifying a new directory entry for the specified memory line, the update logic configuring error correction code circuitry to generate a new combined error correction code for the specified memory line based on predefined dummy data and the new directory entry when predefined stale memory criteria are satisfied.

22. The system of claim 7, wherein each node further includes:
   logic for responding to a transaction request specifying a memory line;
   error correction code circuitry for generating the combined error correction code for the memory line specified by the transaction request; and
   update logic configured to respond to a transaction completion request for the specified memory line, specifying a new directory entry for the specified memory line, the update logic configuring the error correction code circuitry to generate a new combined error correction code for the specified memory line based on the new directory entry for the specified memory line and predefined dummy data when the transaction request renders data stored in the specified memory line stale.

23. The system of claim 22, wherein the update logic includes logic for writing the new directory entry and the new combined error correction code to the main memory.

24. The system of claim 22, wherein:
   each memory line stored in the main memory of the respective node has a home node comprising the respective node;
   the cache memory system of each respective node includes, for each copy of each memory line stored in the cache memory system of the respective node, cache state information indicating whether the copy is an exclusive copy of the memory line; and
   each respective node further includes read logic configured to respond to a transaction request for a particular memory line and its corresponding directory entry, when the cache memory system of the respective node stores a copy of the particular memory line and the cache state information indicates that the copy of the particular memory line is an exclusive copy, by retrieving the copy of the particular memory line from the cache memory system of the respective node and sending the retrieved copy and a predefined null directory entry value.

25. The system of claim 24, wherein the read logic is further configured to respond to the transaction request, when the cache memory system of the respective node does not store a copy of the particular memory line, by retrieving the particular memory line and the corresponding directory entry from the main memory of the respective node and sending the retrieved particular memory line and corresponding directory entry.

26. The system of claim 24, wherein the logic is further configured to respond to a transaction request from the home node for a particular memory line and its corresponding directory entry, when the transaction request requires an exclusive copy of the particular memory line to be stored in the cache memory system of the respective node, by completing the transaction request without changing the corresponding directory entry.

27. The system of claim 24, wherein the logic is further configured to respond to a read request from the home node for a particular memory line and its corresponding directory entry, when the cache memory system of the home node stores a copy of the particular memory line, by sending the copy of the particular memory line retrieved from the cache memory system and a predefined null directory entry value and completing the read request without changing the corresponding directory entry.

28. The system of claim 24, wherein the logic is further configured to mark the cache state information to indicate that a copy of a respective memory line stored in the cache memory system of the home node is an exclusive copy when the cache memory system issues a read request for the respective memory line and the corresponding directory entry for the respective memory line indicates that no cache memory system other than the cache memory system has a copy of the respective memory line, and when the cache memory system issues a write request for the respective memory line.

29. The system of claim 7, wherein each node further includes:
   read logic configured to respond to a transaction request for a specified memory line and its corresponding directory entry, the read logic including
      error correction code circuitry for generating a partial error correction code for the specified memory line, based on data in the specified memory line alone without the corresponding directory entry; and
      a buffer for storing the partial error correction code in the buffer; and
   update logic configured to respond to a transaction completion request for the specified memory line, the transaction completion request specifying a new directory entry for the specified memory line;
   wherein
   the update logic configures the error correction code circuitry to generate a new combined error correction code for the specified memory line based on the partial error correction code stored in the buffer and the new directory entry when a first set of predefined criteria are satisfied; and
   the update logic configures the error correction code circuitry to generate a new combined error correction code for the specified memory line based on the predefined dummy data and the new directory entry when a second set of predefined criteria are satisfied.

30. The system of claim 29, further including write back circuitry for writing the new directory entry and the new combined error correction code to main memory without overwriting the specified memory line when first set of predefined criteria are satisfied and when the second set of predefined criteria are satisfied.

31. The system of claim 29, wherein:
   each memory line stored in the main memory of the respective node has a home node comprising the respective node;
   the cache memory system of each respective node includes, for each copy of each memory line stored in the cache memory system of the respective node, cache state information indicating whether the copy is an exclusive copy of the memory line; and
   the read logic is further configured to respond to a transaction request for a particular memory line and its corresponding directory entry, when the cache memory system of the respective node stores a copy of the particular memory line and the cache state information indicates that the copy of the particular memory line is an exclusive copy, by retrieving the copy of the particular memory line from the cache memory system of the respective node and sending the retrieved copy and a predefined null directory entry value.

32. The system of claim 31, wherein the read logic is further configured to respond to the transaction request, when the cache memory system of the respective node does not store a copy of the particular memory line, by retrieving the particular memory line and the corresponding directory entry from the main memory of the respective node and sending the retrieved particular memory line and corresponding directory entry.

33. The system of claim 31, wherein the logic is further configured to respond to a transaction request from the home node for a particular memory line and its corresponding directory entry, when the transaction request requires an exclusive copy of the particular memory line to be stored in the cache memory system of the home node, by completing the transaction request without changing the corresponding directory entry.

34. The system of claim 31, wherein the logic is further configured to respond to a read request from the home node for a particular memory line and its corresponding directory entry, when the cache memory system of the home node stores a copy of the particular memory line, by sending the copy of the particular memory line retrieved from the cache memory system and a predefined null directory entry value and completing the read request without changing the corresponding directory entry.

35. The system of claim 31, wherein the logic is further configured to mark the cache state information to indicate that a copy of a respective memory line stored in the cache memory system of the home node is an exclusive copy when the cache memory system issues a read request for the respective memory line and the corresponding directory entry for the respective memory line indicates that no cache memory system other than the cache memory system has a copy of the respective memory line, and when the cache memory system issues a write request for the respective memory line.

36. The system of claim 7, wherein each directory entry includes directory state information and each sub-block of each memory line includes a copy of the directory state information.

37. The system of claim 36, wherein:
each memory line stored in the main memory of the respective node has a home node comprising the respective node;
the cache memory system of each respective node includes, for each copy of each memory line stored in the cache memory system of the respective node, cache state information indicating whether the copy is an exclusive copy of the memory line; and
the read logic is further configured to respond to a transaction request for a particular memory line and its corresponding directory entry, when the cache memory system of the respective node stores a copy of the particular memory line and the cache state information indicates that the copy of the particular memory line is an exclusive copy, by retrieving the copy of the particular memory line from the cache memory system of the respective node and sending the retrieved copy and a predefined null directory entry value.

38. The system of claim 37, wherein the read logic is further configured to respond to the transaction request, when the cache memory system of the respective node does not store a copy of the particular memory line, by retrieving the particular memory line and the corresponding directory entry from the main memory of the respective node and sending the retrieved particular memory line and corresponding directory entry.

39. The system of claim 37, wherein the update logic is further configured to respond to a transaction request from the home node for a particular memory line and its corresponding directory entry, when the transaction request requires an exclusive copy of the particular memory line to be stored in the cache memory system of the respective node, by completing the transaction request without changing the corresponding directory entry.

40. The system of claim 37, wherein the logic is further configured to respond to a read request from the home node for a particular memory line and its corresponding directory entry, when the cache memory system of the home node stores a copy of the particular memory line, by sending the copy of the particular memory line retrieved from the cache memory system and a predefined null directory entry value and completing the read request without changing the corresponding directory entry.

41. The system of claim 37, wherein the logic is further configured to mark the cache state information to indicate that a copy of a respective memory line stored in the cache memory system of the home node is an exclusive copy when the cache memory system issues a read request for the respective memory line and the corresponding directory entry for the respective memory line indicates that no cache memory system other than the cache memory system has a copy of the respective memory line, and when the cache memory system issues a write request for the respective memory line.

42. A method for maintaining cache coherence in a multiprocessor computer system, the multiprocessor computer system having a plurality of nodes, comprising:
storing, in a main memory of a respective node of the plurality of nodes, data in a plurality of memory lines of the main memory; wherein each memory line in the main memory of the respective node has a home node comprising the respective node;
storing, in a directory entry corresponding to each respective memory line of the plurality of memory lines in the main memory of the respective node, directory information indicating nodes, other than the respective node, where copies of the respective memory line are stored in cache memory systems;
when a copy of the respective memory line is stored in a cache memory system of the respective node, storing, in the cache memory system of the respective node, cache state information indicating whether the copy is an exclusive copy of the respective memory line; and
at the respective node, responding to a transaction request for a particular memory line and its corresponding directory entry, when the cache memory system of the respective node stores a copy of the particular memory line and the cache state information indicates that the copy of the particular memory line is an exclusive copy, by retrieving the copy of the particular memory line from the cache memory system of the respective node and sending the retrieved copy and a predefined null directory entry value.

43. The method of claim 42, further comprising responding to the transaction request, when the cache memory system of the respective node does not store an exclusive copy of the particular memory line, by retrieving the particular memory line and the corresponding directory entry from the main memory of the respective node and sending the retrieved particular memory line and corresponding directory entry.

44. The method of claim 42, further comprising responding to a transaction request from the home node for a particular memory line and its corresponding directory entry, when the transaction request requires an exclusive copy of the particular memory line to be stored in the cache memory system of the node, by completing the transaction request without changing the corresponding directory entry.

45. The method of claim 43, further comprising responding to a read request from the node for a particular memory line and its corresponding directory entry, when the cache memory system of the node stores a copy of the particular memory line, by sending the copy of the particular memory line retrieved from the cache memory system and a predefined null directory entry value and completing the read request without changing the corresponding directory entry.

46. The method of claim 43, further comprising responding to a read request from the home node for a particular memory line and its corresponding directory entry, when the cache memory system of the home node stores a copy of the particular memory line, by sending the copy of the particular memory line retrieved from the cache memory system and completing the read request without changing the corresponding directory entry.

47. The method of claim 43, further comprising marking the cache state information to indicate that a copy of a respective memory line stored in the cache memory system of the home node of the respective memory line is an exclusive copy when the cache memory system issues a read request for the respective memory line and the corresponding directory entry for the respective memory line indicates that no cache memory system other than the cache memory system has a copy of the respective memory line, and when the cache memory system issues a write request for the respective memory line.

48. A method for maintaining cache coherence in a multiprocessor computer system, wherein the multiprocessor computer system includes a plurality of nodes, comprising:

storing, in a main memory of a respective node of the plurality of nodes, data in a plurality of memory lines of the main memory; wherein each memory line in the main memory of the respective node has a home node comprising the respective node;

storing, in a directory entry corresponding to each respective memory line of the plurality of memory lines in the main memory of the respective node, directory information indicating nodes, other than the respective node, where copies of the respective memory line are stored in cache memory systems;

storing, for each respective memory line of the plurality of memory line in the main memory of the respective node, a combined error correction code, the combined error correction code for detecting and correcting errors in both the respective memory line and the corresponding directory entry; and detecting and correcting errors in both a respective memory line and the corresponding directory entry using the combined error correction code for the respective memory line.

49. The method of claim 48, wherein

N is an integer greater than 1;

each respective memory line is stored in the main memory in N sub-blocks, each memory line sub-block including a portion of the respective memory line data and a portion of the directory entry corresponding to the respective memory line;

the combined error correction code for each respective memory line comprises N sub-block combined error correction codes, each sub-block combined error correction code for detecting and correcting errors in both the memory line portion and directory entry portion in a corresponding memory line sub-block; and the detecting and correcting includes detecting and correcting errors in both the memory line portion and the corresponding directory entry portion of a memory line sub-block using the sub-block combined error correction code corresponding to the memory line sub-block.

50. The method of claim 49, the directory entry storing including:

storing, in the directory entry portion of each memory line sub-block for a respective memory line, an identical copy of directory state information indicating a directory state of the directory entry corresponding to the respective memory line.

51. The method of claim 48, further comprising:

at a respective node of the multiprocessor computer system, responding to a transaction request for a specified memory line and its corresponding directory entry by:

generating a partial error correction code for the memory line based on data in the specified memory line without its corresponding directory entry;

storing the partial error correction code; and responding to a transaction completion request for the specified memory line by:

specifying a new directory entry for the specified memory line; and generating a new combined error correction code for the memory line based on the partial error correction code and the new directory entry.

52. The method of claim 48, further comprising at a respective node of the multiprocessor computer system, responding to a transaction completion request for a specified memory line by:

specifying a new directory entry for the specified memory line; and generating a new combined error correction code for the specified memory line based on predefined dummy data and the new directory entry.

* * * * *